US012694416B2

(12) United States Patent
Marti et al.

(10) Patent No.: US 12,694,416 B2
(45) Date of Patent: Jul. 28, 2026

(54) SYSTEMS AND METHODS FOR BUSINESS ANALYTICS MODEL SCORING AND SELECTION

(71) Applicant: Prevedere Inc., Columbus, OH (US)

(72) Inventors: Loren Roger Marti, Green Cove Springs, FL (US); Richard Wagner, Columbus, OH (US); Elena Shatilova, Columbus, OH (US)

(73) Assignee: Prevedere Inc., Columbus, OH (US)

( * ) Notice: Subject to any disclaimer, the term of this patent is extended or adjusted under 35 U.S.C. 154(b) by 133 days.

(21) Appl. No.: 18/642,834

(22) Filed: Apr. 23, 2024

(65) Prior Publication Data

US 2024/0346531 A1     Oct. 17, 2024

Related U.S. Application Data

(60) Division of application No. 17/060,068, filed on Sep. 30, 2020, now Pat. No. 11,995,667, which is a continuation-in-part of application No. 16/221,416, filed on Dec. 14, 2018, now Pat. No. 10,896,388, and a continuation-in-part of application No. 15/154,697, filed on May 13, 2016, now Pat. No. 10,740,772, and a continuation-in-part of application No. 13/558,333, filed on Jul. 25, 2012, now Pat. No. 10,176,533.

(Continued)

(51) Int. Cl.
*G06Q 30/0202*          (2023.01)

(52) U.S. Cl.
CPC ............................... *G06Q 30/0202* (2013.01)

(58) Field of Classification Search
CPC ... G06Q 30/0202; G06Q 10/067; G06Q 40/12

USPC ........................................................ 705/3–44
See application file for complete search history.

(56) References Cited

U.S. PATENT DOCUMENTS

| | | | |
|---|---|---|---|
| 5,432,530 A | 7/1995 | Arita et al. | |
| 5,454,371 A | 10/1995 | Fenster et al. | |

(Continued)

FOREIGN PATENT DOCUMENTS

| | | | | |
|---|---|---|---|---|
| CA | 2712407 A1 * | 2/2011 | ............. | G06Q 30/06 |
| WO | WO-03025689 A2 * | 3/2003 | ......... | G05B 19/4188 |
| WO | WO2015/183255 | 12/2015 | | |

OTHER PUBLICATIONS

Francesco et al (Lassoing the HAR model: A Model Selection Perspective on Realized Volatility Dynamics), Universitat St. Gallen , Nov. 2012, pp. 1-47 (Year: 2012).*

(Continued)

*Primary Examiner* — Romain Jeanty
(74) *Attorney, Agent, or Firm* — IP Strategy Consulting

(57)          ABSTRACT

The present invention relates to systems and methods for model scoring and selection. Six or more metrics that are relevant to the model are initially selected, and weights are assigned to each metric. A first subset of the metrics are selected, including metrics for model fit and model error for primary regression. A second subset of metrics including at least two penalty functions are then selected for percentage of incidence. The scores from the primary regression and penalty calculations are aggregated into a final score. Multiple models can be scored and utilized to select a "best" model via an iterative culling of low scoring models and "breeding" of the high scoring models.

20 Claims, 22 Drawing Sheets

Related U.S. Application Data

(60) Provisional application No. 62/955,282, filed on Dec. 30, 2019.

(56)                    References Cited

U.S. PATENT DOCUMENTS

| | | | |
|---|---|---|---|
| 5,475,851 | A | 12/1995 | Kodosky et al. |
| 5,727,161 | A | 3/1998 | Purcell, Jr. |
| 5,793,375 | A | 8/1998 | Tanaka |
| 6,054,984 | A | 4/2000 | Alexander |
| 6,064,984 | A | 5/2000 | Ferguson et al. |
| 6,133,914 | A | 10/2000 | Rogers et al. |
| 6,163,773 | A | 12/2000 | Kishi |
| 6,362,842 | B1 | 3/2002 | Tahara et al. |
| 6,473,084 | B1 | 10/2002 | Phillips et al. |
| 6,549,864 | B1 | 4/2003 | Portyrailo |
| 6,614,456 | B1 | 9/2003 | Rzepkowski et al. |
| 6,757,217 | B2 | 6/2004 | Eastwood et al. |
| 6,801,199 | B1 | 10/2004 | Wallman |
| 6,822,662 | B1 | 11/2004 | Cook et al. |
| 6,901,383 | B1 | 5/2005 | Ricketts et al. |
| 7,072,863 | B1 | 7/2006 | Phillips |
| 7,134,093 | B2 | 11/2006 | Etgen et al. |
| 7,348,979 | B2 | 3/2008 | Tso |
| 7,363,584 | B1 | 4/2008 | Molesky |
| 7,493,277 | B1 * | 2/2009 | Uhl ........................ G06Q 40/04 |
| | | | 705/37 |
| 7,496,852 | B2 | 2/2009 | Eichorn et al. |
| 7,554,521 | B1 | 6/2009 | Migos et al. |
| 7,698,188 | B2 | 4/2010 | Hollas et al. |
| 7,788,127 | B1 | 8/2010 | Gilgur |
| 7,800,613 | B2 | 9/2010 | Hanrahan et al. |
| 7,818,246 | B2 | 10/2010 | Cushing et al. |
| 7,904,376 | B2 | 3/2011 | Shapiro et al. |
| 7,941,742 | B1 | 5/2011 | Hao et al. |
| 7,991,672 | B2 | 8/2011 | Crowder |
| 7,999,809 | B2 | 8/2011 | Beers et al. |
| 8,019,638 | B1 | 9/2011 | Uhl |
| 8,051,000 | B2 | 11/2011 | Kurczek et al. |
| 8,306,847 | B2 | 11/2012 | Sperry |
| 8,315,938 | B1 | 11/2012 | Forsythe |
| 8,346,682 | B2 | 1/2013 | Steed et al. |
| 8,381,090 | B2 | 2/2013 | Bruckner et al. |
| 8,571,909 | B2 | 10/2013 | Miller |
| 8,731,983 | B2 | 5/2014 | Gudla |
| 8,732,696 | B2 | 5/2014 | Bukary |
| 8,843,427 | B1 | 9/2014 | Lin |
| 8,965,895 | B2 * | 2/2015 | Chu ........................ G06F 16/283 |
| | | | 707/736 |
| 10,176,533 | B2 | 1/2019 | Wagner |
| 10,740,772 | B2 | 8/2020 | Wagner et al. |
| 10,896,388 | B2 | 1/2021 | Cooper et al. |
| 11,995,667 | B2 | 5/2024 | Marti et al. |
| 2003/0126054 | A1 | 7/2003 | Purcell, Jr. |
| 2003/0212618 | A1 | 11/2003 | Keyes et al. |
| 2004/0030667 | A1 * | 2/2004 | Xu ........................ G06Q 40/08 |
| 2004/0169638 | A1 | 9/2004 | Kaplan |
| 2005/0021485 | A1 | 1/2005 | Nodelman et al. |
| 2007/0005296 | A1 | 1/2007 | Beresniewicz |
| 2007/0088648 | A1 | 4/2007 | Mather et al. |
| 2007/0156565 | A1 | 7/2007 | Singer et al. |
| 2007/0244741 | A1 | 10/2007 | Blume |
| 2008/0086401 | A1 | 4/2008 | Mather |
| 2008/0133313 | A1 | 6/2008 | Bateni et al. |
| 2008/0147486 | A1 | 6/2008 | Wu |
| 2008/0195930 | A1 | 8/2008 | Tolle |
| 2009/0012653 | A1 | 1/2009 | Cheng et al. |
| 2009/0083120 | A1 | 3/2009 | Strichman |
| 2009/0187606 | A1 | 7/2009 | Allweil et al. |
| 2009/0216684 | A1 | 8/2009 | Helweg |
| 2010/0076819 | A1 | 3/2010 | Wannier |
| 2010/0100469 | A1 | 4/2010 | Buchanan et al. |
| 2010/0138275 | A1 | 6/2010 | Bateni et al. |
| 2010/0185976 | A1 | 7/2010 | Sadanandan |
| 2010/0306031 | A1 | 12/2010 | McCauley |
| 2011/0007097 | A1 | 1/2011 | Williams |
| 2011/0087985 | A1 | 4/2011 | Buchanan et al. |
| 2011/0107265 | A1 | 5/2011 | Buchanan et al. |
| 2011/0208701 | A1 | 8/2011 | Jackson et al. |
| 2011/0231339 | A1 | 9/2011 | Hansen |
| 2011/0246260 | A1 | 10/2011 | Gilbert |
| 2011/0264487 | A1 * | 10/2011 | Koerner ................. G06Q 10/04 |
| | | | 705/7.38 |
| 2011/0283188 | A1 | 11/2011 | Farrenkopf et al. |
| 2011/0302112 | A1 | 12/2011 | Shan |
| 2011/0313809 | A1 | 12/2011 | Baek |
| 2012/0016269 | A1 | 1/2012 | Moctezuma de la Barrera |
| 2012/0101912 | A1 | 4/2012 | Sen |
| 2012/0150576 | A1 | 6/2012 | Wagenblatt |
| 2012/0159384 | A1 | 6/2012 | Zyskowski et al. |
| 2012/0188250 | A1 | 7/2012 | Kaplan et al. |
| 2012/0245970 | A1 | 9/2012 | Pulido De Los Reyes et al. |
| 2012/0316981 | A1 * | 12/2012 | Hoover ................... G06F 16/25 |
| | | | 705/26.4 |
| 2012/0317506 | A1 | 12/2012 | Zhao et al. |
| 2012/0317509 | A1 | 12/2012 | Ludwig et al. |
| 2013/0024170 | A1 | 1/2013 | Dannecker et al. |
| 2013/0041792 | A1 | 2/2013 | King et al. |
| 2013/0055132 | A1 | 2/2013 | Foslien |
| 2013/0060603 | A1 | 3/2013 | Wagner |
| 2013/0066678 | A1 | 3/2013 | May |
| 2013/0086521 | A1 | 4/2013 | Grossele et al. |
| 2013/0122482 | A1 | 5/2013 | Sukkarieh |
| 2013/0179130 | A1 | 7/2013 | Zhandov |
| 2013/0179739 | A1 | 7/2013 | Ikegami |
| 2014/0032553 | A1 * | 1/2014 | Chu ........................ G06F 16/285 |
| | | | 707/737 |
| 2014/0032611 | A1 | 1/2014 | Chu et al. |
| 2014/0074557 | A1 | 3/2014 | Rallapalli |
| 2014/0129269 | A1 | 5/2014 | Rey |
| 2014/0149180 | A1 | 5/2014 | Yaseen |
| 2014/0172654 | A1 | 6/2014 | Wagner |
| 2014/0324537 | A1 | 10/2014 | Gilbert |
| 2014/0351023 | A1 | 11/2014 | Rallapalli |
| 2015/0134401 | A1 | 5/2015 | Heuer |
| 2015/0248397 | A1 | 9/2015 | Burstein |
| 2015/0262095 | A1 * | 9/2015 | Rajasekaran ...... G06Q 10/0637 |
| | | | 705/7.28 |
| 2015/0339572 | A1 * | 11/2015 | Achin ...................... G06N 5/04 |
| | | | 706/46 |
| 2016/0048126 | A1 | 2/2016 | Bhattacharjya et al. |
| 2016/0092799 | A1 | 3/2016 | Khan |
| 2016/0110812 | A1 | 4/2016 | Mun |
| 2016/0335550 | A1 | 11/2016 | Achin et al. |
| 2017/0091692 | A1 | 3/2017 | Guo |
| 2017/0124459 | A1 * | 5/2017 | Jayaraman .............. G06N 5/02 |
| 2019/0188612 | A1 | 6/2019 | Cooper et al. |

OTHER PUBLICATIONS

SAS/Graph 9.2 Reference—Second Edition, SAS, 2010.
Jelen, Bill, Rev Up To Excel 2010—Upgraders Guide to Excel 2010; Holy Marco! Books, 2010.
Moyle, Michael et al., A Flick in the Right Direction: A Case Stude of Gestural Input In Behavior and Information Technology, 2005.
Microsoft Excel 2010 Charts and Graphs—Class Workbook UCSD Biomedical Library Workshop, Unknown Date.
Basic Usage of AS/ETS Software to Forecast a Time Series NESUG16, Statistics, Data Analysis & Econometrics, 2003.
Cyclical Analysis and Exponential Forecasting Simetar, Simulation & Econometrics to Analyze Risk, 2004.
Lahiri, Kajal, Evaluating Probability Forecasts for GDP Declines 2007.
Tableau Software Combination Charts, Tableau Software, Inc., 2010.
Tableau Software Forecasting, Tableau Software, Inc., 2012.
Tableau Visual Guidebook, Tableau Software, Inc., 2010.
Macdonald, MRRHWQ, Excel 2003 For Starters—Chapter 9 Pogue Press, O'Reily, Feb. 9, 2009.
Stolte, Chris et al., Polaris: A System for Query, Analysis, and Visualization of Multidimensional Relational Databases IEEE Trans-

(56)          References Cited

OTHER PUBLICATIONS actions on Visualization and Computer Graphics, vol. 8, No. 1. Jan.-Mar. 2002.

Cognos 8 Business Intelligence—Report Studio User Guide, Cognos Inc., 2006.

SAS/ETS User's Guide Version 8—vol. 1 SAS, Institute Inc., 1999.

Springer "Business performance forecasting of convenience store based on enhanced fuzzy neural network", Oct. 2008; Neural Computing and Applications, vol. 17 Issue 5-6, pp. 569-578. (Year:2008).

USPTO, ISA/US, "Notification of Transmittal of the ISR and the Written Opinion of the International Searching Authority, or the Declaration," in PCT Application No. PCT/US2016/067026, Mar. 27, 2017, 7 pages.

European Patent Office, EPO Application No. 16876720.0, "Supplementary Extended European Search Report and Opinion", May 28, 2019, 7 pages.

ISA/US, "Notification of Transmittal of the ISR and the Written Opinion of the International Searching Authority, or the Declaration," in PCT Application No. PCT/US2020/066991, Apr. 29, 2021, 10 pages.

Gunawardana et al. "A survey of accuracy evaluation metrics of recommendation tasks." Journal of Machine Learning Research 10.12 (2009). Dec. 9, 2009 (Dec. 9, 2009) Retrieved on Apr. 10, 2021 (Apr. 10, 2021) from <https://www.jmlr.org/papers/volume10/gunawardana09a/gunawardana09a.pdf> entire document.

Canadian Intellectual Property Office, "Examination Search Report", in CA Application No. 3,006,988, Jan. 30, 2023, 3 pages.

Chang "Better Evaluation Metrics Lead to Better Machine Translation", Jan. 2011, Proceedings of the 2011 Conference on Empirical Methods in Natural Language Processing, pp. 375-384 (Year:2011).

Xiang "A Multi-Indexed Logistic Model for Time Series", Dec. 2016, School of Graduate Studies, East Tennessee State University (Year:2016).

* cited by examiner

450

460

605

RECEIVE DATA TO MODEL

610

RECEIVE HORIZON, DEMAND INDUSTRY, TARGET INDUSTRY AND LOCALE (IF APPLICABLE)

620

RECEIVE OUTPUT FORMAT REQUIREMENTS

630

SELECT DATA SETS FROM APPLICABLE RANKED BUCKETS

635

DATA RANKING

640

GENERATION OF INITIAL MODELS

650

SCORE MODELS

660

GENETIC ALGORITHM SELECTION OF MODEL

670

USER VIEW MODEL

680

BACKTEST MODEL UPON USER PROMPT

690

EDIT MODEL BY USER

635

705
NORMALIZE DATASETS

715
COMPUTE STRENGTH SCORES FOR EACH DATA SET

725
PRESENT INDICATORS TO USER FOR SELECTION

735
USER CLASSIFIES AND SETS TARGET HORIZON FOR EACH INDICATOR

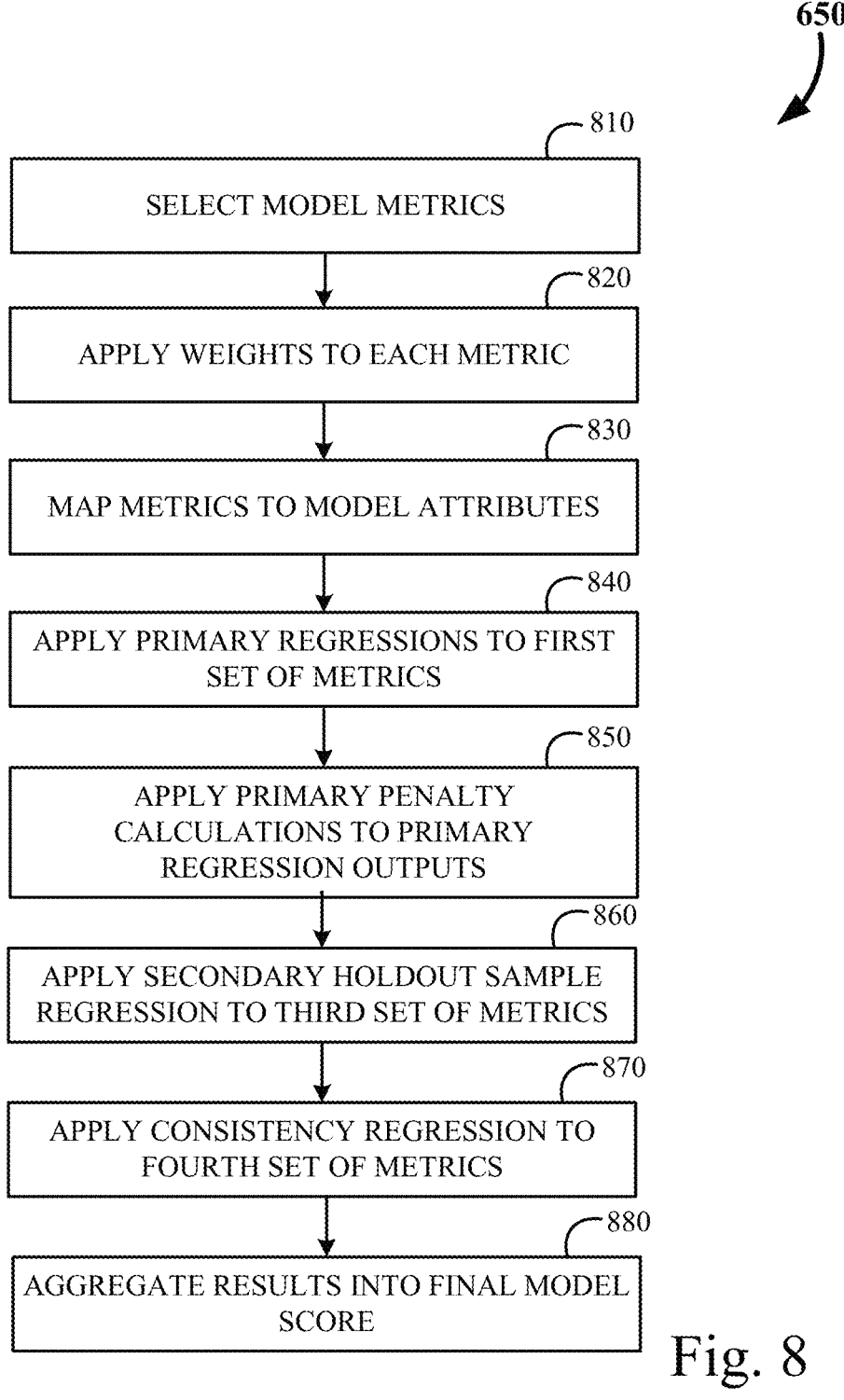

650

810
SELECT MODEL METRICS

820
APPLY WEIGHTS TO EACH METRIC

830
MAP METRICS TO MODEL ATTRIBUTES

840
APPLY PRIMARY REGRESSIONS TO FIRST SET OF METRICS

850
APPLY PRIMARY PENALTY CALCULATIONS TO PRIMARY REGRESSION OUTPUTS

860
APPLY SECONDARY HOLDOUT SAMPLE REGRESSION TO THIRD SET OF METRICS

870
APPLY CONSISTENCY REGRESSION TO FOURTH SET OF METRICS

880
AGGREGATE RESULTS INTO FINAL MODEL SCORE

SET/EDIT PRE-ADJUSTMENT FACTOR

1020

SET/EDIT POST-ADJUSTMENT FACTOR

1030

ADD/REMOVE INDICATOR WEIGHT(S)

1040

SET/EDIT INDICATOR TIME OFFSET(S)

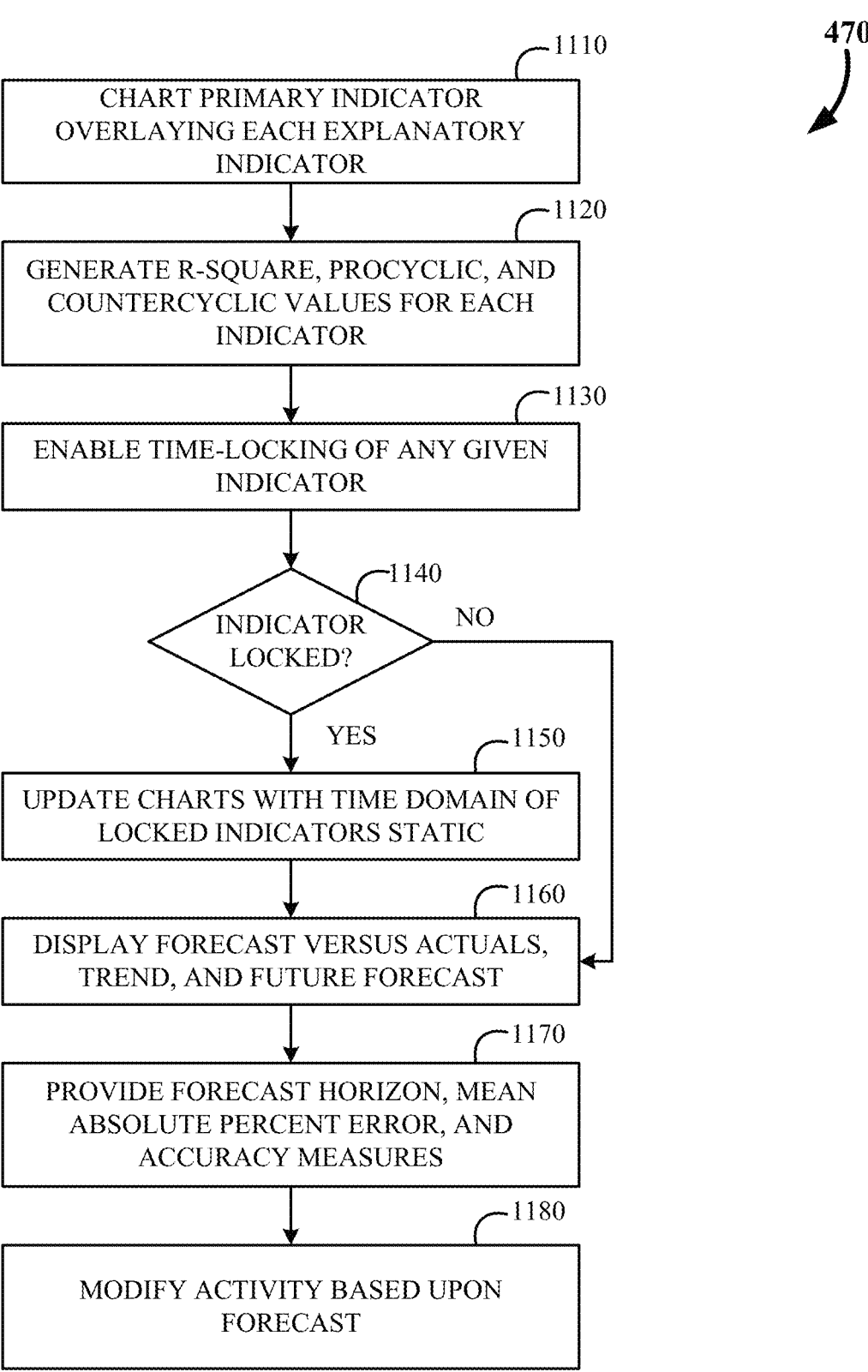

470

1110
CHART PRIMARY INDICATOR OVERLAYING EACH EXPLANATORY INDICATOR

1120
GENERATE R-SQUARE, PROCYCLIC, AND COUNTERCYCLIC VALUES FOR EACH INDICATOR

1130
ENABLE TIME-LOCKING OF ANY GIVEN INDICATOR

1140
INDICATOR LOCKED?

NO

YES

1150
UPDATE CHARTS WITH TIME DOMAIN OF LOCKED INDICATORS STATIC

1160
DISPLAY FORECAST VERSUS ACTUALS, TREND, AND FUTURE FORECAST

1170
PROVIDE FORECAST HORIZON, MEAN ABSOLUTE PERCENT ERROR, AND ACCURACY MEASURES

1180
MODIFY ACTIVITY BASED UPON FORECAST

Fig. 11

1200
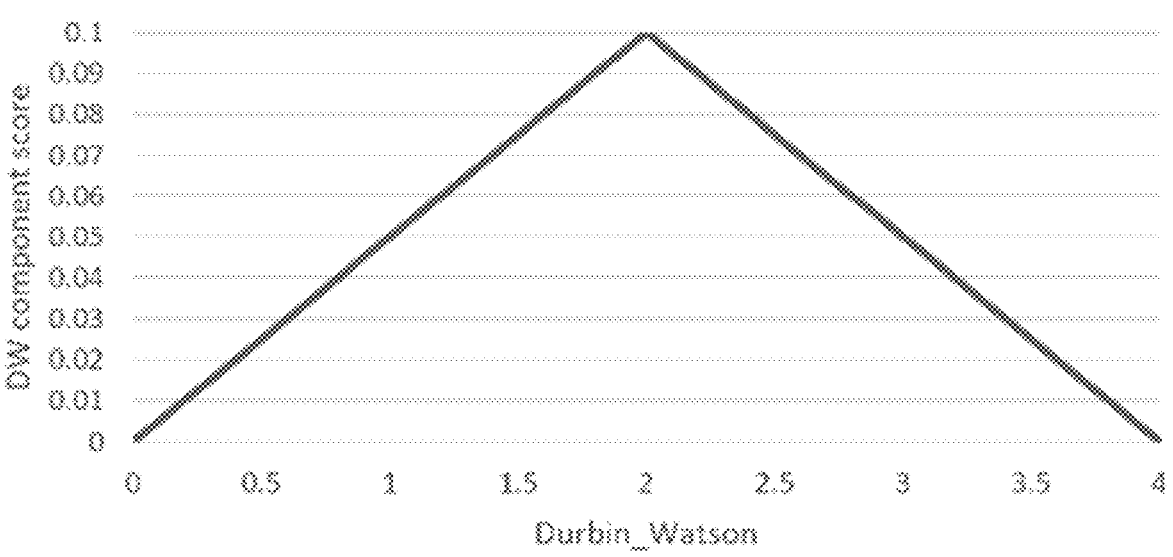
Fig. 12

1300

| | Var 1 | Var 2 | Var 3 | Var 4 | Var 5 | Var 6 | Var 7 | Var 8 | Var 9 | Var 10 | Var 11 | Var 12 | Model Score |
|---|---|---|---|---|---|---|---|---|---|---|---|---|---|
| Individual 1 | 0 | 0 | 0 | 0 | 1 | 0 | 0 | 1 | 1 | 0 | 1 | 0 | 0.80 |
| Individual 2 | 0 | 1 | 1 | 1 | 0 | 1 | 1 | 1 | 0 | 1 | 0 | 0 | 0.78 |
| Individual 3 | 1 | 1 | 1 | 0 | 0 | 1 | 0 | 1 | 1 | 0 | 1 | 0 | 0.60 |
| Individual 4 | 0 | 1 | 0 | 1 | 0 | 1 | 0 | 0 | 1 | 1 | 1 | 0 | 0.52 |
| REST IN PEACE | | | | | | | | | | | | | |
| Individual 5 | 1 | 0 | 1 | 0 | 0 | 0 | 0 | 0 | 0 | 1 | 0 | 0 | 0.40 |
| Individual 6 | 0 | 0 | 0 | 0 | 1 | 1 | 0 | 0 | 1 | 1 | 1 | 1 | 0.20 |
| Individual 7 | 1 | 1 | 1 | 1 | 1 | 1 | 0 | 0 | 1 | 0 | 0 | 1 | 0.19 |
| Individual 8 | 0 | 0 | 0 | 1 | 0 | 0 | 1 | 1 | 1 | 0 | 1 | 0 | 0.18 |
| Population | | | | | | | | | | | | | |

1400

A random chunk of "DNA" is selected and swapped.

A random "mutation" is possible which would add or drop a variable from the model.

| | Var 1 | Var 2 | Var 3 | Var 4 | Var 5 | Var 6 | Var 7 | Var 8 | Var 9 | Var 10 | Var 11 | Var 12 |
|---|---|---|---|---|---|---|---|---|---|---|---|---|
| Individual 1 | 0 | 0 | 0 | 0 | 1 | 0 | 0 | 1 | 1 | 0 | 1 | 0 |
| Invididual 2 | 0 | 1 | 1 | 1 | 0 | 1 | 1 | 1 | 0 | 1 | 0 | 0 |

1500

| | Var 1 | Var 2 | Var 3 | Var 4 | Var 5 | Var 6 | Var 7 | Var 8 | Var 9 | Var 10 | Var 11 | Var 12 | Model Score |
|---|---|---|---|---|---|---|---|---|---|---|---|---|---|
| Individual 1 | 0 | 0 | 0 | 1 | 0 | 1 | 0 | 1 | 1 | 0 | 1 | 1 | 0.75 |
| Invididual 2 | 0 | 1 | 1 | 0 | 1 | 0 | 1 | 1 | 0 | 1 | 0 | 0 | 0.82 |

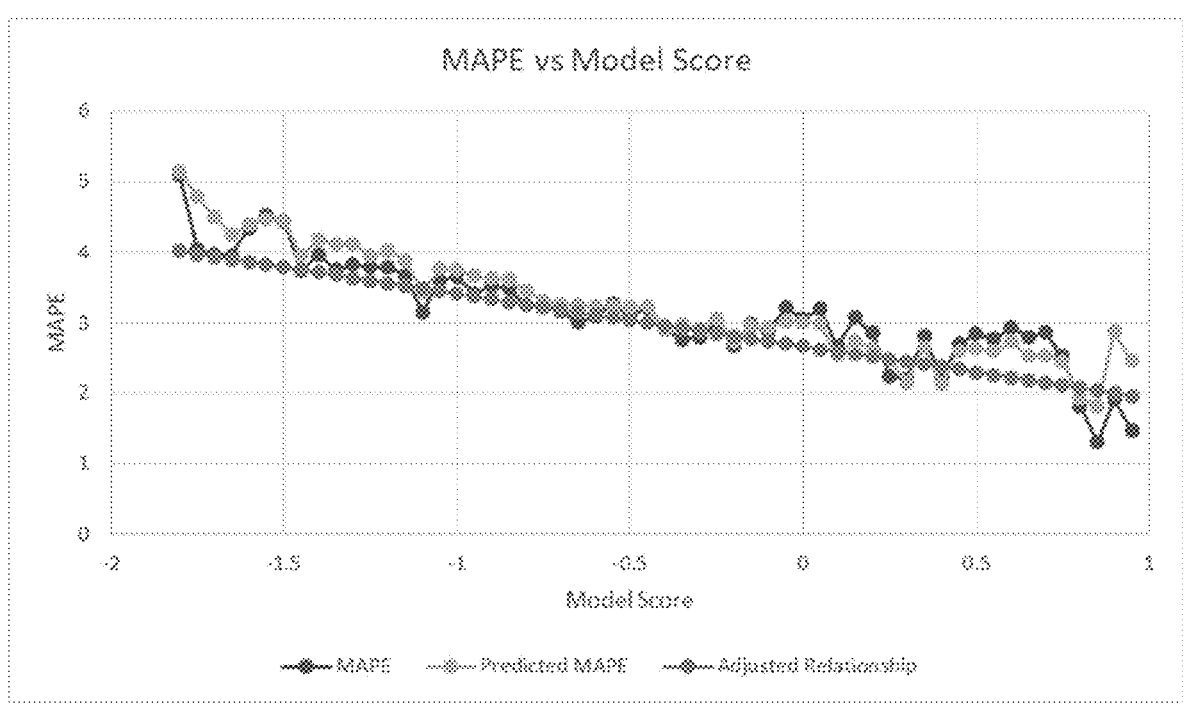
Fig. 16

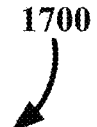
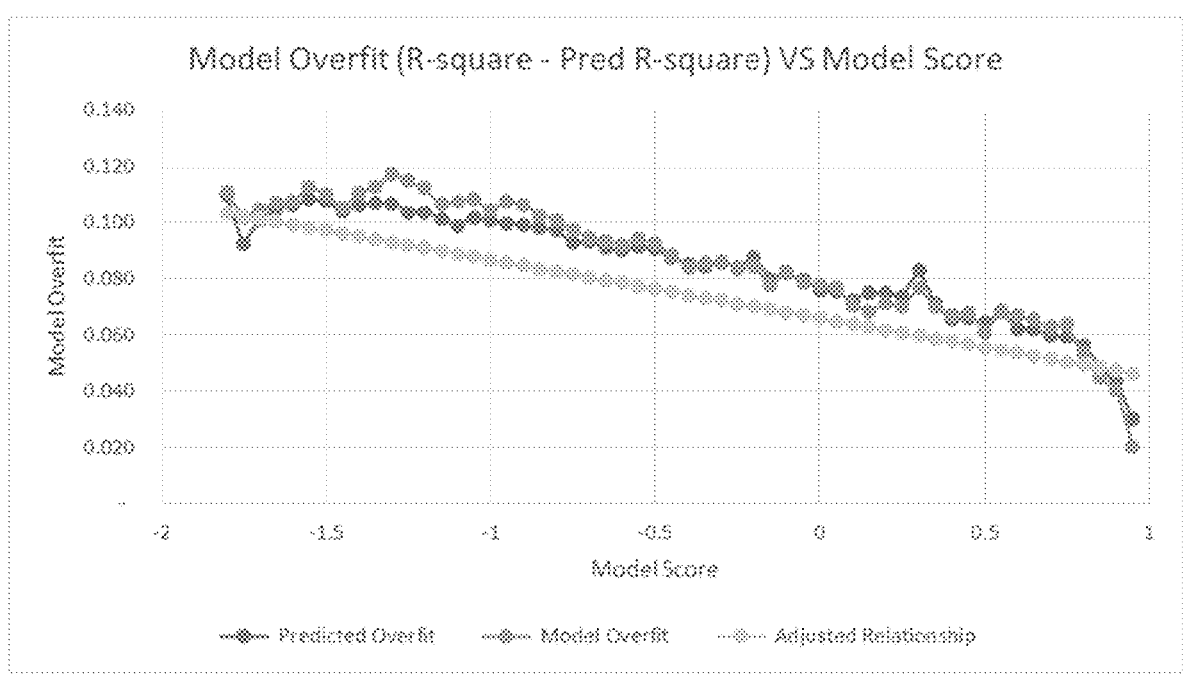
Fig. 17

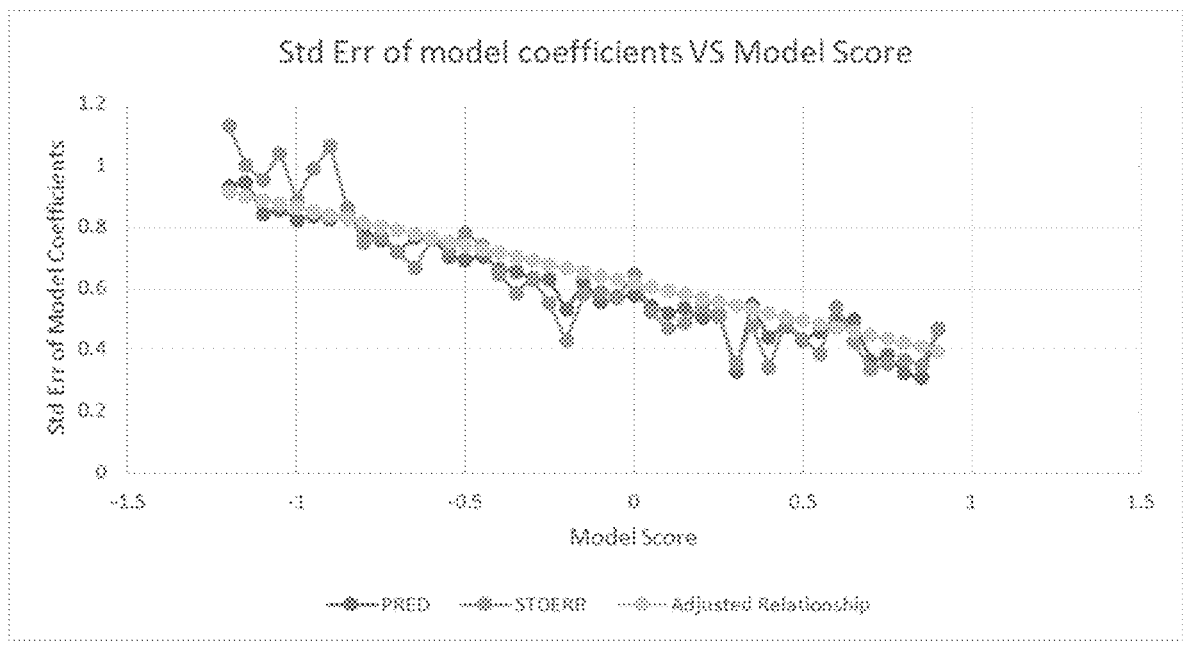
Fig. 18

1900

SYSTEMS AND METHODS FOR BUSINESS ANALYTICS MODEL SCORING AND SELECTION

CROSS REFERENCE TO RELATED APPLICATIONS

This Application, is a Division of, and claims the benefit and priority of application Ser. No. 17/060,068, filed on Sep. 30, 2020.

Application Ser. No. 17/060,068, claims the benefit and priority of Provisional Application No. 62/955,282, filed on Dec. 30, 2019.

Application Ser. No. 17/060,068 also is a continuation-in-part and claims priority of application Ser. No. 13/558, 333, filed on Jul. 25, 2012, entitled "INTERACTIVE CHART UTILIZING SHIFTING CONTROL TO RENDER SHIFTING OF TIME DOMAINS OF DATA SERIES", now U.S. Pat. No. 10,176,533, issued Jan. 8, 2019.

Application Ser. No. 17/060,068 additionally is a continuation-in-part and claims priority of application Ser. No. 15/154,697, filed on May 13, 2016, entitled "SYSTEMS AND METHODS FOR FORECASTING BASED UPON TIME SERIES DATA", now U.S. Pat. No. 10,740,772, issued Aug. 11, 2020.

Furthermore, application Ser. No. 17/060,068 is a continuation-in-part and claims priority of application Ser. No. 16/221,416, filed on Dec. 14, 2018, entitled "SYSTEMS AND METHODS FOR BUSINESS ANALYTICS MANAGEMENT AND MODELING", now U.S. Pat. No. 10,896, 388, issued Jan. 19, 2021.

All of the above-listed applications/patents are incorporated herein in their entirety by this reference.

BACKGROUND

The present invention relates to systems and methods for the objective modeling and ultimate qualitative selection of business analytics models. Business analytics allows for improved insight into the current and future state of industries. These models are very useful to business decision makers, investors and operations experts.

Many factors influence the success or failure of a business or other organization. Many of these factors include controllable variables, such as product development, talent acquisition and retention, and securing business deals. However, a significant amount of the variables influencing a business' success are external to the organization. These external factors that influence an organization are typically entirely out of control of the organization, and are often poorly understood or accounted for during business planning. Generally, one of the most difficult variables for a business to account for is the general health of a given business sector.

While these external factors are not necessarily able to be altered, being able to incorporate them into business planning allows a business to better understand the impact on the business, and make strategic decisions that take into account these external factors. This may result in improved business performance, investing decisions, and operational efficiency. However, it has traditionally been very difficult to properly account for, or model, these external factors; let alone generate meaningful forecasts using many different factors in a statistically meaningful and user friendly way.

For example, many industry outlooks that current exist are merely opinions of so-called "experts" that may identify one or two factors that impact the industry. While these expert forecasts of industry health have value, they provide a very limited, and often inaccurate, perspective into the industry. Further these forecasts are generally provided in a qualitative format, rather than as a quantitative measure. For example, the housing industry may be considered "healthy" if the prior year demand was strong and the number of housing starts is up. However, the degree of 'health' in the market versus a prior period is not necessarily available or well defined.

As a result, current analytical methods are incomplete, not quantitative, time consuming and labor intensive processes that are inadequate for the today's competitive, complex and constantly evolving business landscape. A number of models for predicting business conditions exist, but there is often little guarantee as to the accuracy or consistency of these models. Currently, laborious manual review of the models is undertaken to determine if a model is "good" by various business experts. Not only is such an endeavor costly (both in time and resources), ultimately the result is the opinion of one or more individuals as to the health of the model. This also leads to considerable inconsistency between what is considered a "good" model based upon the subjective opinions of the various reviewers.

It is therefore apparent that an urgent need exists for a robust automated system for scoring and selection of business analytics models. These systems and methods for scoring and selecting models enables better organizational and investment functioning.

SUMMARY

To achieve the foregoing and in accordance with the present invention, systems and methods for the scoring and selection of business analytics models are provided. Such systems and methods enable business persons, investors, and industry strategists to better understand the present state of their industries, and more importantly, to have foresight into the future state of their industry.

In some embodiments, six or more metrics that are relevant to the model are initially selected, and weights are assigned to each metric. A first subset of the metrics are selected, including metrics for model fit and model error. A primary regression is performed on this first subset of metrics, and the results are multiplied by the corresponding weights. A second subset of metrics including at least two penalty functions are then selected. These metrics are quantified by the percentage of incidence, and the results are multiplied by the corresponding penalty weights. The scores from the primary regression and penalty calculations are aggregated into a final score.

In some embodiments, a holdout sample regression is also performed. These holdout regressions are likewise weighted and aggregated into the score to prevent over fit. Additionally, simulation and consistency regressions can be performed, including multiplication by corresponding weights, and integration into the aggregate score.

Generally the weights for the first subset of metrics are a value between 0.01 and 0.3. The weights corresponding to the penalty metrics are generally values between −0.5 and −4. The model fit metric is a predictive R-squared calculation, and the model error metric is a mean absolute percentage error (MAPE) calculation.

The penalty metrics may include at least a percentage of variables in the model with an incorrect sign and a percentage of variables in the model with a p-value above a threshold and a percentage of variables with a Variance Inflation Factor (VIF) above a threshold. In some instances, penalty metrics are not based upon this binary measure of a threshold, but may rather vary according to the p-value score and VIF levels. These modulated penalty metrics are linearly correlated to the p-values and VIF measures.

In some alternate embodiments, the systems and methods may be utilized to select a "best" model. In this process the initial set of models are received and are represented as a binary string. The models are each scored in the manner discussed above. The models are then ranked by their scores, and a subset of the initial set of models with a ranking below a threshold are removed to yield a remaining set of models. Randomly selected variables from these remaining models are then exchanged to "breed" new models to make up for the removed models. These new models are then also scored, and the full set of models are re-ranked. This process may be iterated until a set of acceptable models are arrived at. This may include when all models have scores above a threshold, or once the newly scored models scores do not change much from one iteration to the next. From this "acceptable" set of models the model with the highest score is selected.

A random variable can randomly be selected for removal or alteration when the models are being "bred" in order to introduce additional variability. The models removed may be a set number of models (for example, half the models with the lowest scores), or any models below a set score threshold. The scoring of each model is stored in a shared database such that each model is only scored once.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIG. 8 is a flow chart diagram of model scoring, in accordance with some embodiments;

FIG. 11 is a flow chart diagram of report generation, in accordance with some embodiments;

FIG. 12 is an example illustration of a Durbin-Watson Model Score Impact Chart, in accordance with some embodiments;

FIG. 16 is an example chart of MAPE vs model scores, in accordance with some embodiments;

FIG. 17 is an example chart of Model Overfit vs model scores, in accordance with some embodiments;

FIG. 18 is an example chart of model coefficient standard error vs model scores, in accordance with some embodiments;

DETAILED DESCRIPTION

Figure 1A:
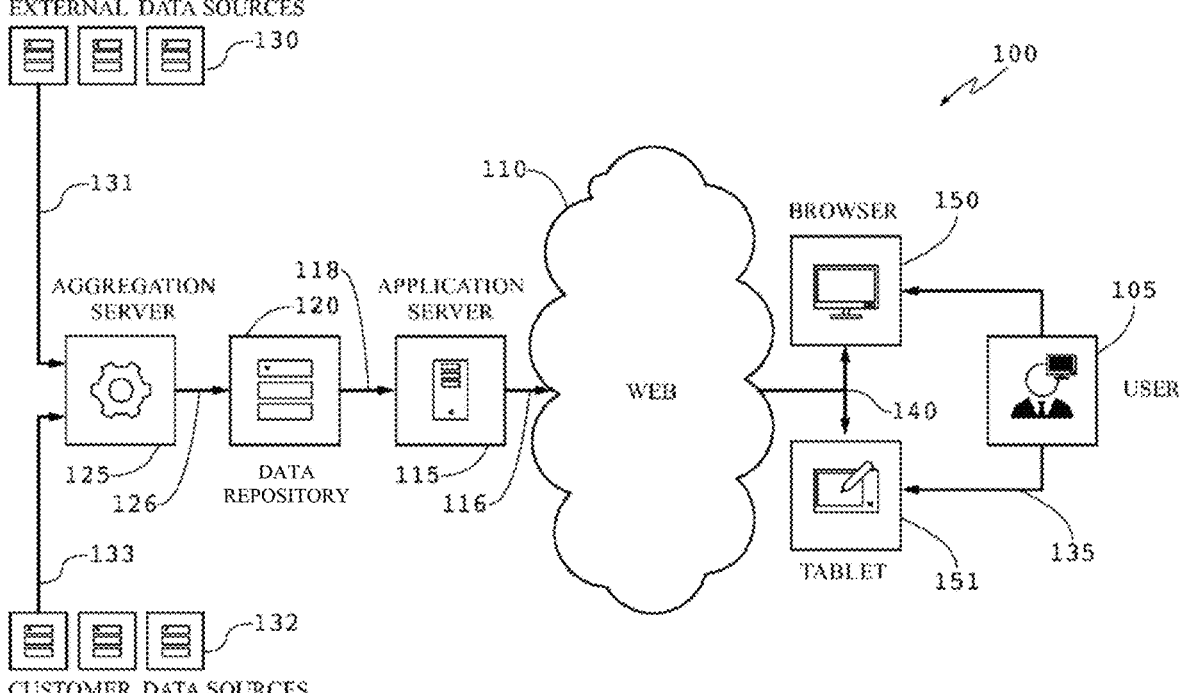
FIG. 1A is an example logical diagram of a data management system for business analytics management and modeling, in accordance with some embodiments.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "only," "first," "initially," "next," "subsequently," "before," "after," "lastly," and "finally," are not meant to limit the scope of the present invention as the embodiments disclosed herein are merely exemplary.

Note that significant portions of this disclosure will focus on the management and modeling of data for businesses. While this is intended as a common use case, it should be understood that the presently disclosed systems and methods are useful for the modeling and management of data based upon any time series data sets, for consumption by any kind of user. For example, the presently disclosed systems and methods could be relied upon by a researcher to predict trends as easily as it is used by a business to forecast sales trends. As such, any time the term 'business' is used in the context of this disclosure it should be understood that this may extend to any organization type: individual, investor group, business entity, governmental group, non-profit, religious affiliation, research institution, and the like. Further, references to business analytics, or business models should be understood to not be limited to commerce, but rather to any situation where such analysis may be needed or desired.

Lastly, note that the following description will be provided in a series of subsections for clarification purposes. These following subsections are not intended to artificially limit the scope of the disclosure, and as such any portion of one section should be understood to apply, if desired, to another section.

I. Data Management Systems for Modeling Business Analytics

The present invention relates to systems and methods for using available data and metrics to generate an entirely new data set through transformations to yield models. Particularly, this disclosure shall focus on the scoring and ultimate selection of models for usage in business analytics forecasting. While various indices are already known, the presently disclosed systems and methods provide the ability to generate score and select a highly accurate model that is forward looking rather than providing merely a snapshot of the current situation. Such systems and methods allow for superior insight into current and near future health and activity of a given industry sector, product, company or other dimension of interest. This enables for better business planning, preparation, investment, and generally may assist in influencing behaviors in more profitable ways.

To facilitate discussion, FIG. 1A is an example logical diagram of a data management system for business analytics modeling 100. The data analysis system 100 connects a given analyst user 105 through a network 110 to the system application server 115. A database/data repository 120 (or other suitable dataset based upon forecast sought) is linked to the system application server via connection 118 and the database 120 thus provides access to the data necessary for utilization by the application server 115.

The database 120 is populated with data delivered by and through the data aggregation server 125 via connection 126. Data aggregation server 125 is configured to have access to a number of data sources, for instance external data sources 130 through connection 131. The data aggregation server can also be configured to have access to proprietary or internal data sources, e.g. customer data sources, 132, through connection 133. The aggregated data may be stored in a relational database (RDBM) or in big data-related storage facilities (e.g., Hadoop, NoSQL), with its formatting pre-processed to some degree (if desired) to conform to the data format requirement of the analysis component.

Network 110 provides access to the user or data analyst (the user analyst). User analyst 105 will typically access the system through an internet browser, such as Chrome or Mozilla Firefox, or a standalone application, such as an app on tablet 151. As such the user analyst (as shown by arrow 135) may use an internet connected device such as browser terminal 150, whether a personal computer, mainframe computer, or VT100 emulating terminal. Alternatively, mobile devices such as a tablet computer 151, smart telephone, or wirelessly connected laptop, whether operated over the internet or other digital telecommunications networks, such as a 4G network. In any implementation, a data connection 140 is established between the terminal (e.g. 150 or 151) through network 110 to the application server 115 through connection 116.

Network 110 is depicted as a network cloud and as such is representative of a wide variety of telecommunications networks, for instance the world wide web, the internet, secure data networks, such as those provided by financial institutions or government entities such as the Department of Treasury or Department of Commerce, internal networks such as local Ethernet networks or intranets, direct connections by fiber optic networks, analog telephone networks, through satellite transmission, or through any combination thereof.

The database 120 serves as an online available database repository for collected data including such data as internal metrics. Internal metrics can be comprised of, for instance, company financial data of a company or other entity, or data derived from proprietary subscription sources. Economic, demographic, and statistical data that are collected from various sources and stored in a relational database, hosted and maintained by a data analytics provider and made accessible via the internet. The data analytics provider may also arrange for a mirror of the datasets to be available at the company's local IT infrastructure or within a company intranet, which is periodically updated as required.

The application server 115 provides access to a system that provides a set of calculations based on system formula used to calculate the leading, lagging, coincident, procyclic, acyclic, and counter-cyclic nature of economic, demographic, or statistical data compared to internal metrics, e.g., company financial results, or other external metrics. The system also provides for formula that may be used to calculate a plurality of models based on projected or actual economic, demographic, and statistical data and company financial or sold volume or quantity data. Details of the formulas and processes utilized for the calculation of these models shall be provided in further detail below. These calculations can be displayed by the system in chart or other graphical format.

In some embodiments, changes observed in a metric may also be classified according to its direction of change relative to the indicator that it is being measured against. When the metric changes in the same direction as the indicator, the relationship is said to be 'procyclic'. When the change is in the opposite direction as the indicator, the relationship is said to be 'countercyclic'. Because it is rare that any two metrics will be fully procyclic or countercyclic, it is also possible that a metric and an indicator can be acyclic—e.g., the metric exhibits both procyclic and countercyclic movement with respect to the indicator.

The application residing on server 115 is provided access to interact with the customer datasource(s) 132 through the database 120 to perform automatic calculations which identify leading, lagging, and coincident indicators as well as the procyclic, acyclic, and counter-cyclic relationships between customer data and the available economic, demographic, and statistical data. Additionally, the models may be automatically populated on a periodic schedule, e.g. every month. Users 105 of the software applications that can be made available on the application server 115 are able to select and view charts or monitor dashboard modules displaying the results of the calculations performed by the system. In some embodiments, user 105 can select data in the customer repository for use in the calculations that may allow the user to forecast future performance, or tune the business analytics models. The types of indicators and internal data are discussed in more detail in connection with the discourse accompanying the following figures. Alternatively, users can view external economic, demographic, and statistical data only and do not have to interface with internal results, at the option of the user. In yet other embodiments, all internal and external data may be shielded from the user, and only the models and analytics are provided to the user for ease of use.

Data is collected for external indicators and internal metrics of a company through the data aggregation server 125. The formulas built into the application identify relationships between the data. Users 105 can then use the charting components to view the results of the calculations and models. In some embodiments, the data can be entered into the database 120 manually, as opposed to utilizing the data aggregation server 125 and interface for calculation and forecasting. In some embodiments, the users 105 can enter and view any type of data and use the applications to view charts and graphs of the data.

Figure 1B:
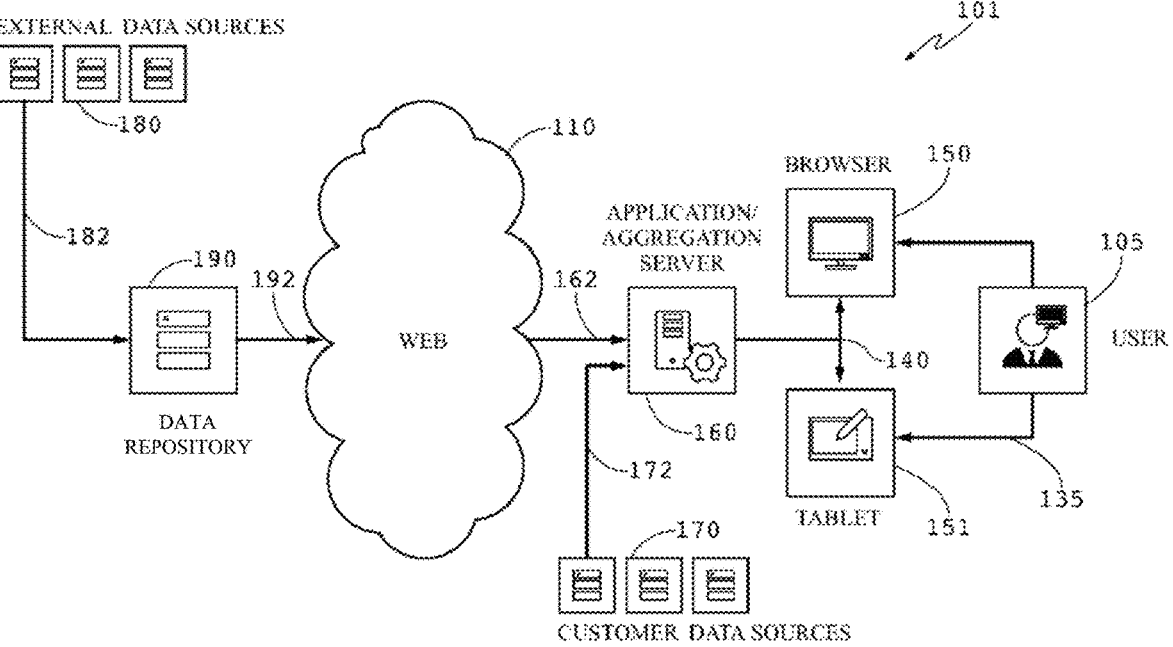
FIG. 1B is a second example logical diagram of a data management system for business analytics management and modeling, in accordance with some embodiments.

Alternatively, in some system users may have sensitive data that requires it to be maintained within the corporate environment. FIG. 1B depicts components of the system in an exemplary configuration to achieve enhanced data security and internal accessibility while maintaining the usefulness of the system and methods disclosed herein. For example, the data management system 101 may be configured in such a manner so that the application and aggregation server functions described in connection with FIG. 1A are provided by one or more internal application/aggregation servers 160. The internal server 160 access external data sources 180 through metrics database 190, which may have its own aggregation implementation as well. The internal server accesses the metrics database 190 through the web or other such network 110 via connections 162 and 192. The metrics database 190 acquires the appropriate data sets from one or more external sources, as at 180, through connection 182.

The one or more customer data sources 170 may be continue to be housed internally and securely within the internal network. The internal server 160 access the various internal sources 170 via connection 172, and implements the same type of aggregation techniques described above. The user 105 of the system then accesses the application server 160 with a tablet 151 or other browser software 150 via connections 135 and 140, as in FIG. 1A. External data sources 130 and 180 may be commercial data subscriptions, public data sources, or data entered into an accessible form manually.

Figure 2A:
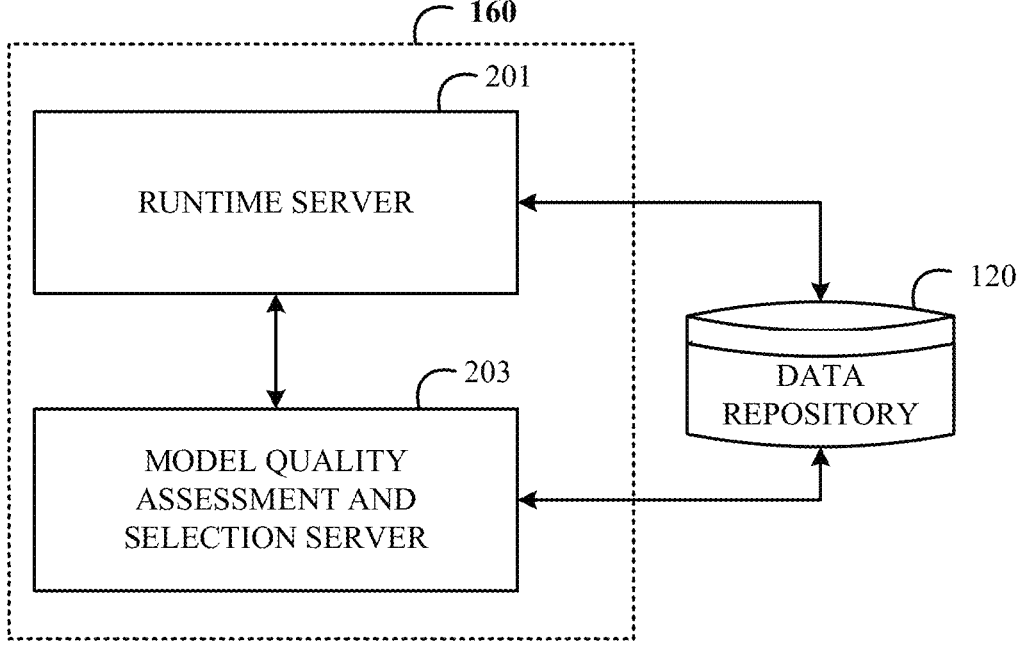
FIG. 2A is an example logical diagram of an application server, in accordance with some embodiments.

FIG. 2A is an example logical diagram of an application server 160 (or 115) that includes various subcomponents that act in concert to enable a number of functions, including the generation of project dashboards and the generation, scoring and selection of business analytics models. Generally the data being leveraged for the generation of models includes economic, demographic, geopolitical, public record and statistical data. In some embodiments, the system utilizes any time series dataset. This time series data stored in the metrics database 120, is available to all subsystems of the application server 160 for manipulation, transformation, aggregation, and analysis.

The application server 160 includes two main components, a runtime server 201 responsible for model generation and deployment for the generation of business analytics dashboards, and a model quality assessment and selection server 203, which is a specialized system designed to consume historical data 120 and the generated models from the runtime server 201 to select models that have consistent and accurate performance.

Figure 2B:
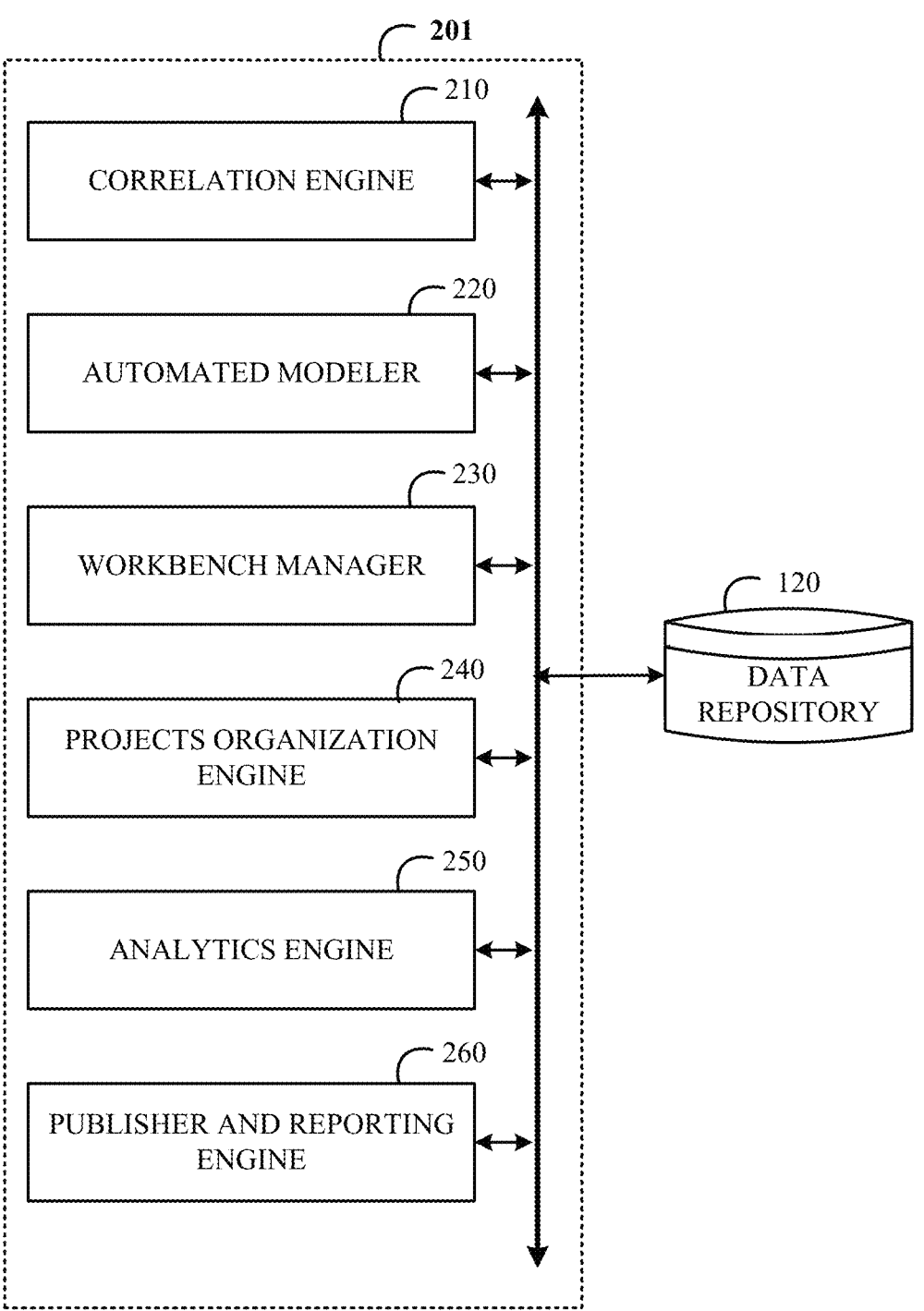
FIG. 2B is an example logical diagram of a runtime server, in accordance with some embodiments.

The subcomponents of the runtime server 201 are illustrated in FIG. 2B as unique modules within the server coupled by a common bus. While this embodiment is useful for clarification purposes, it should be understood that the presently discussed runtime server may consist of logical subcomponents operating within a single or distributed computing architecture, may include individual and dedicated hardware for each of the enumerated subcomponents, may include hard coded firmware devices within a server architecture, or any permutation of the embodiments described above. Further, it should be understood that the listed subcomponents are not an exhaustive listing of the functionality of the runtime server 201, and as such more or fewer than the listed subcomponents could exist in any given embodiment of the application server when deployed.

The runtime server 201 includes a correlation engine 210 which generates initial information regarding the metrics that are utilized for the generation of models. For example, the degree of procyclic or counter-cyclic relationship that the indicator expresses may be determined by the correlation engine 210. Additionally, the correlation engine 210 may determine factors such as the number of major and minor outliers for the given index, seasonality level of the indicator, degree of data overlap between the indicator and other indicators, difference of an indicator in terms of number of periods in the last update, the number of models already leveraging the indicator and frequency of the indicator, for example.

The runtime server 201 also includes a modeler 220. The modeler's 220 functionality shall be discussed in considerable detail below; however, at its root it allows for the advanced compilation of many indicators (including other published composite metrics and forecasts) and enables unique manipulation of these datasets in order to generate models from any time series datasets. The modeler 220 may operate in close conjunction with the model quality assessment and selection server 203 for the final selection and assessment of the various models that are generated.

Some of the manipulations enabled by the modeler 220 are the ability to visualize, on the fly, the $R^2$, procyclic and countercyclic values for each indicator compared to the model, and may also allow for the locking of any indicators time domain, and to shift other indicators and automatically update statistical measures. Additionally, the modeler 220 may provide the user suggestions of suitable indicators, and manipulations to indicators to ensure a 'best' fit between prior actuals and the forecast over the same time period. The 'best' fit may include a localized maxima optimization of weighted statistical measures. For example, the $R^2$, procyclic and countercyclic values could each be assigned a multiplier and the time domain offset used for any given indicator could be optimized for accordingly. The multipliers/weights could, in some embodiments, be user defined.

Figure 3:
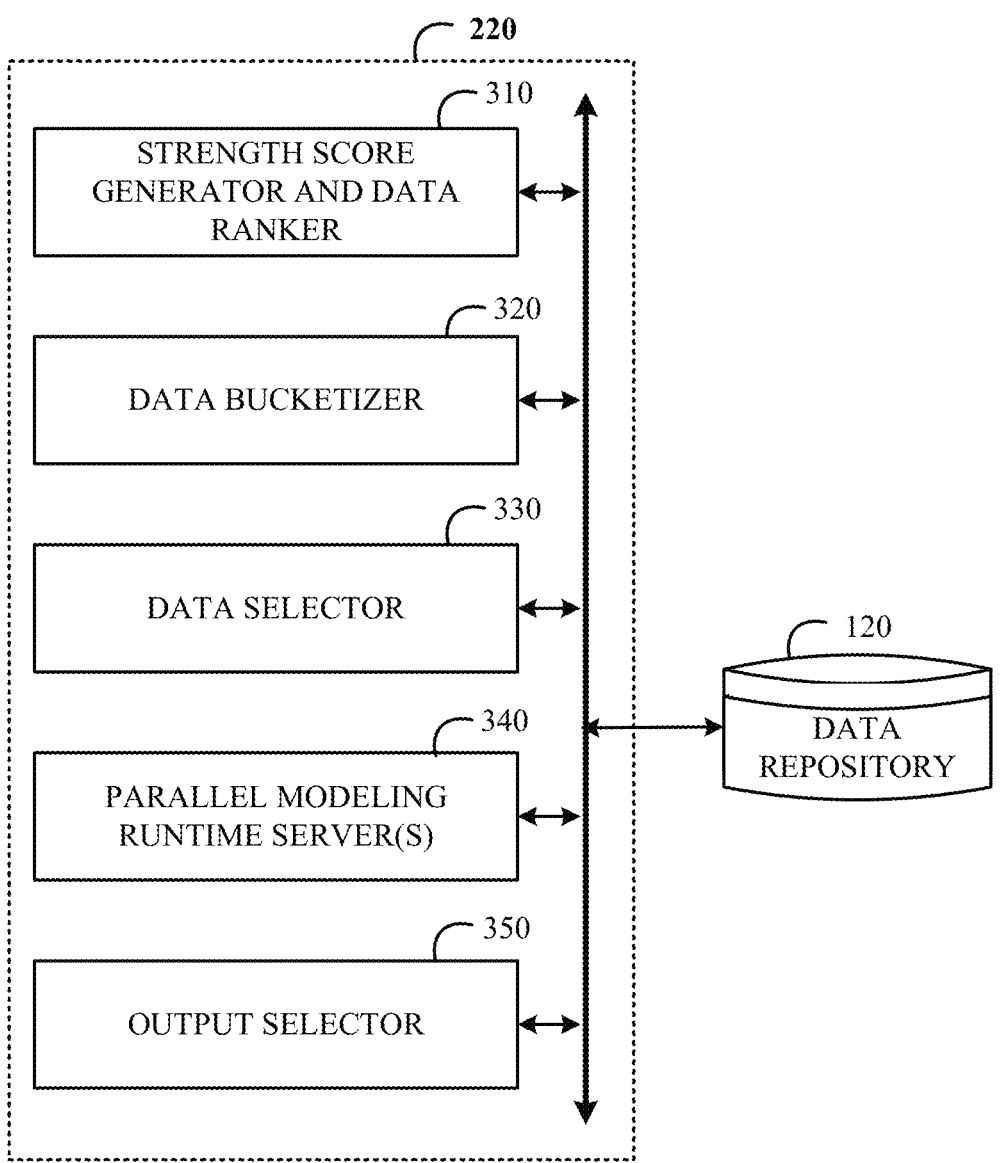
FIG. 3 is an example logical diagram of an automated modeler, in accordance with some embodiments.

FIG. 3 provides a greater detailed illustration of the modeler 220. Critical to the modeling is the determination of which indicators are to be utilized in a given model. A 'strength score' may be calculated for each indicator to assist in this determination. The strength score generator and data ranker 310 consumes the indicator data, along with metrics compiled by the correlation engine 210, to generate the strength score for a given indicator. Note, that the model quality assessment and selection server 203 generates a score for a given model. These model scores, as will be discussed in considerable detail below, are distinct from the indicator strength scores discussed here. The indicators are then ranked by their strength indicators.

As noted, an R-squared value for each indicator can be calculated. R-squared calculation is known, and involves the degree of variance in the dependent variable (the modeled variable) that is predicted from the independent variable (here the indicator). For example, the R-squared value may be calculated by first computing the mean of observable data ($\bar{y}$):

$$\bar{y} = \frac{1}{n}\sum_{i=1}^{n}y_i$$

The total sum of squares is calculated:

$$SS_{tot} = \sum_{i}(y_i - \bar{y})^2$$

The regression sum of squares is next computed using predicted values (f):

$$SS_{reg} = \sum_{i}(f_i - \bar{y})^2$$

The sum of the squares of the residuals is then calculated:

$$SS_{res} = \sum_{i}(y_i - f_i)^2 = \sum_{i}e_i^2$$

Lastly the coefficient of determination (R-squared) is calculated:

$$R^2 = 1 - \frac{SS_{res}}{SS_{tot}}$$

The R-squares value for any given indicator will vary based upon the variable it is being used to model. In addition to the R-squared value, the degree of procyclic relationship between the indicator and the model is received from the correlation engine 210. Also, as noted, the number of minor and major outliers for the indicator are computed. Additionally, the correlation engine will note if an indicator exhibits seasonality. If it does, then that indicator receives a value of 0.95, whereas a non-seasonal indicator is assigned a value of 1.05. Data overlap between the primary indicator (aka dependent variable) and each of the (explanatory) indicators is provided. The overlap is the number of data points that is shared between the two.

The difference in the last updated date, as a number of periods, the number of models the indicator is used in, the total number of models, and the frequency of the indicator is also received. In some embodiments, the frequency is one of monthly, quarterly, semiannual, or annual. These frequencies are assigned values of 54, 18, 9 or 5, respectively.

In some embodiments, the strength score is determined by first adding together the R-squared and procyclic values. A frequency of use factor is calculated as the number of models the indicator is used in divided by the total number of models, and the result added to one. A last update factor is calculated as the last updated date minus two the result divided by twenty, and the result then subtracted from one. An outlier factor is computed as one minus the number of minor outliers divided by one hundred, the result then minus the number of major outliers divided by twenty. A minimum length factor is lastly calculated as the data overlap divided by the frequency value.

The summed R-squared and procyclic value is multiplied the seasonality factor, the frequency of use factor, the last update factor, the outlier factor, the minimum length factor and one hundred to generate the strength score. For example, assume an indicator has the following values:

| | |
|---|---|
| R-squared | 0.5593 |
| Procyclic | 0.6032 |
| Minor Outlier count | 3 |
| Major Outlier count | 1 |
| Seasonality | No (1.05) |
| Difference in last updated date | 2 |
| Number of models using the index | 50 |
| Total number of models | 500 |
| Frequency | Monthly (54) |

This example indicator's strength score would then be calculated as the following:

| | | |
|---|---|---|
| R-Squared + Procyclic | 0.5593 + 0.6032 | 0.34 |
| Seasonality Factor | 1.05 | 1.05 |
| Frequency of use factor | 1 + (50/500) | 1.1 |
| Last updated Factor | $1 - \dfrac{(2-2)}{20}$ | 1 |
| Outliers Factor | $1 - \dfrac{3}{100} - \dfrac{1}{20}$ | 0.92 |
| Minimum Length Factor | $\dfrac{64}{54}$ | 1.19 |
| Strength Score | $0.34 \times 1.5 \times 1.1 \times 1 \times 0.92 \times 1.19 \times 100$ | 61 |

The indicators are ranked in order from the highest strength score to the lowest strength score. They are then assigned to one of four 'buckets' to be utilized in model generation by a data bucketizer 320. These buckets include macroeconomic datasets, datasets applicable to the specific industry, datasets applicable to the demand industry, and miscellaneous datasets. Besides the macroeconomic bucket, the datasets in each bucket ideally have local (state level) data as well as country level datasets. When local data is unavailable, country level data may be substituted for. The datasets populating each of the buckets may be selected based upon their strength scores and their applicable tags. For example, if the demand industry bucket is for steel, only datasets tagged for steel would be used to populate the bucket.

Returning to FIG. 2B, the runtime server 201 also includes a workbench manager 230 for the consolidated display of projects, data related to the projects and associated models. The workbench manager 230 keeps track of user access controls, recent activity and data updates. This information may be compiled and displayed to the user in an easily understood interface.

The application server 160 also includes an access controller (not illustrated) to protect various data from improper access. Even within an organization, it may be desirable for various employees or agents to have split access to various sensitive data sources, forecasts or models. Further, within a service or consulting organization, it is very important to separate various clients' data, and role access control enables this data from being improperly comingled. A projects organization engine 240 may include the access controller, or work in concert with it, in order to provide a consolidated interface where the projects associated with the user are displayed.

An analytics engine 250 may take the output from the modeler 220, and any additional data, and provide analytical analysis of the results. For example, models may be back-tested, where the as-of dates may be altered and the resulting forecast is compared against actuals. Contribution information, accuracy measures, and definitions are all provided by the analytics engine 250. This component also allows the users to interact with and edit any model they have access to, and add annotations to the model results. All this information may be compiled in a configurable manner into one or more reports.

Lastly, a publisher 260 allows for the reports generated by the analytics engine 250, and/or specific models generated via the modeler 220 to be published, with appropriate access controls, for visualization and manipulation by the users or other intended audiences.

Figure 2C:
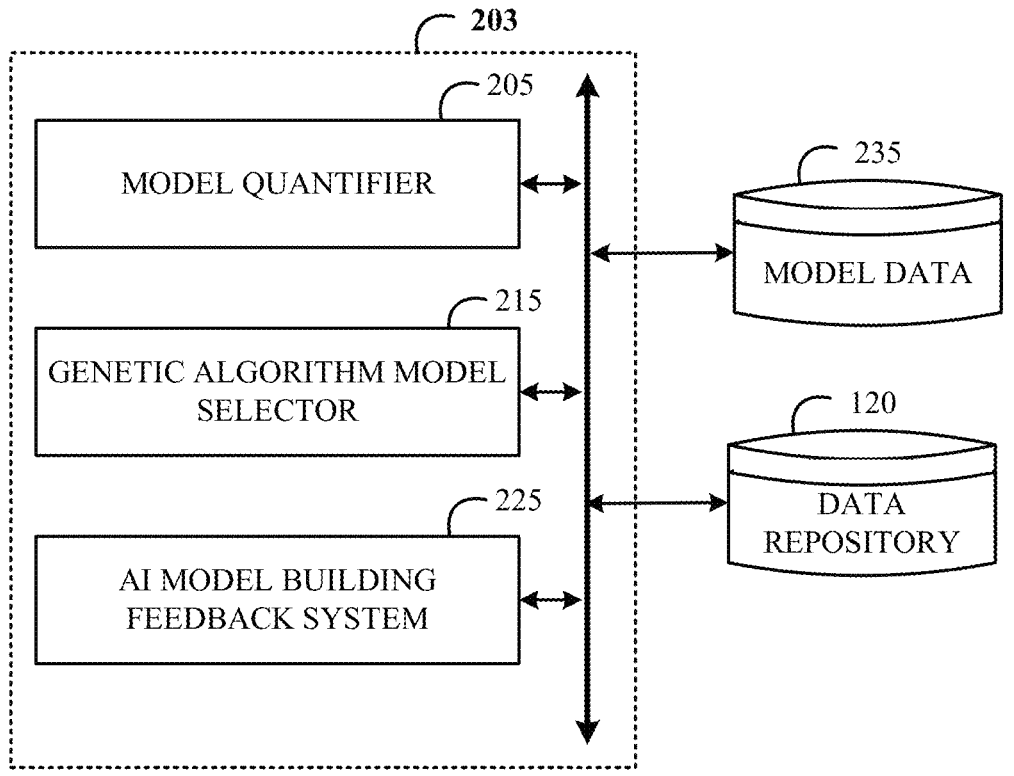
FIG. 2C is an example logical diagram of a model quality assessment and selection server, in accordance with some embodiments.

Turning to FIG. 2C, the model quality assessment and selection server 203 is provided in greater detail. As noted previously, model data 235 from the modeler 220 is consumed by the model quality assessment and selection server 203, along with historical data 120 in the scoring and selection of the models. A model quantifier 205 consumes the various generated models and analyzes the various model metrics for each regression run and potentially applies penalty scores to various indicators. These indicators are likewise weighted, and a final aggregate score for the model is generated. The specific process for the model scoring will be discussed in considerable detail below. The model scores have utility in themselves, but may also be leveraged by the genetic algorithm model selector to undergo an iterative process whereby known models are scored, parsed through, expanded and rescored until a list of high scoring models is identified. At this stage, the "best" model based upon the score is selected for usage.

The model selection not only identifies a best model, but also determines variables that are correlated with a high scoring model. These variables may optionally be fed back to the modeler 220 via the AI model building feedback system 225 for improved future model generation. In alternate embodiments, only the model score, and the underlying variables that are used to generate the score are provided back in the feedback loop. The modeler may then utilize these scores and variables to select for improved future models.

By automating an otherwise time-consuming and labor-intensive process, the above-described model generation, scoring and selection system offers many advantages, including the generation of highly relevant and accurate models that are forward looking, and the ability to directly compare the models to historical actual data. Further, through the usage of regression models, specific forecast model metrics can be consumed by the regression model to predict model accuracy. As such, the application server no longer requires significant user expertise. The result is substantially reduced user effort needed for the generation of timely and accurate business analytics reports.

Now that the systems for data management for generating, scoring and selecting models have been described in considerable detail, attention will be turned towards methods of operation in the following subsection.

II. Data Management and Modeling Scoring and Selection Methods

Figure 4:
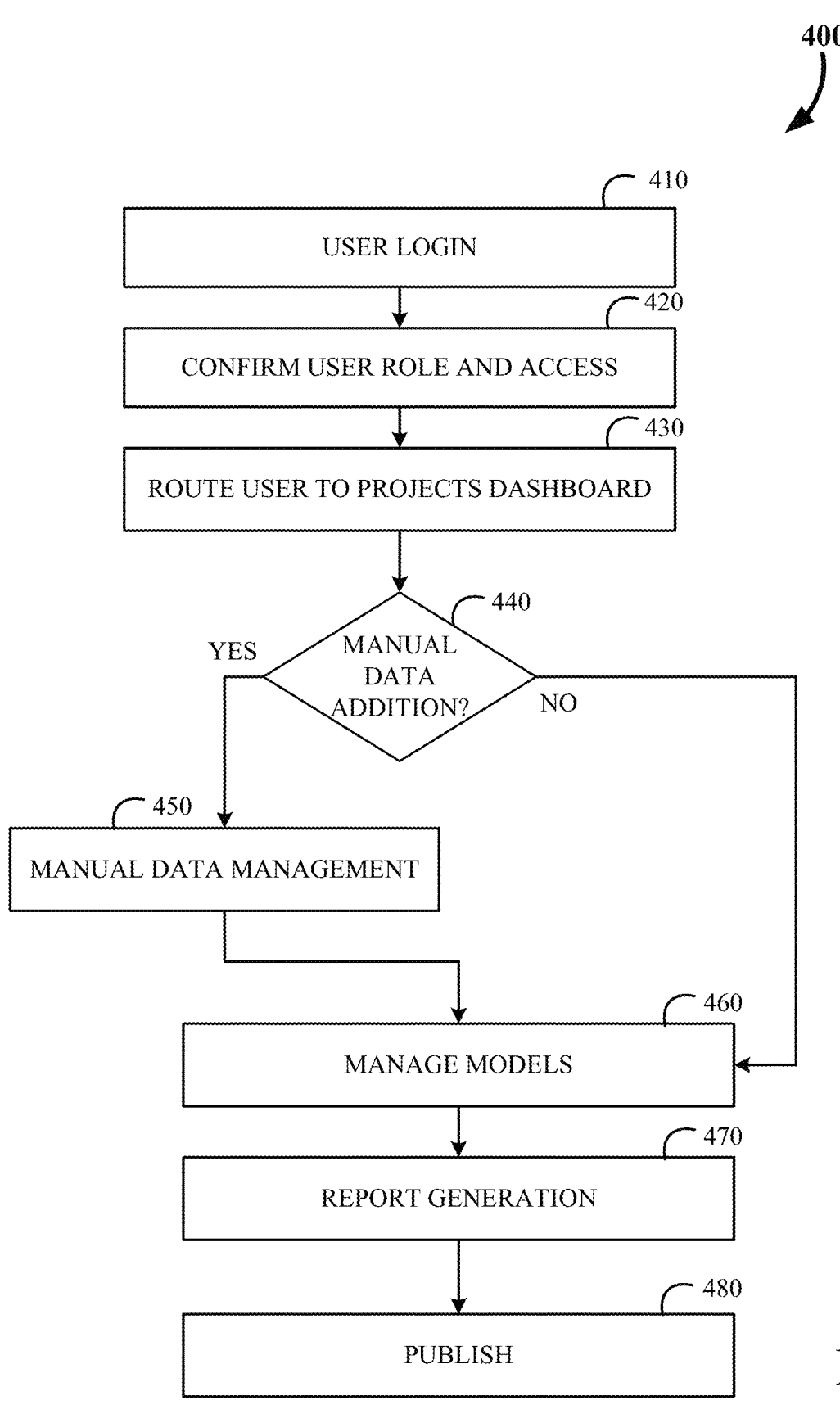
FIG. 4 is a flow chart diagram of an example high level process for business analytics management, in accordance with some embodiments.

To facilitate the discussion, a series of flowcharts are provided. FIG. 4 is a flow chart diagram of an example high level process 400 for data management and business analytics reporting. In this example process, the user of the system initially logs in (at 410) using a user name and password combination, biometric identifier, physical or software key, or other suitable method for accessing the system with a defined user account. The user account enables proper access control to datasets to ensure that data is protected within an organization and between organizations.

The user role access is confirmed (at 420) and the user is able to search and manipulate appropriate datasets. This allows the user to access project dashboards (at 430) for enhanced analysis of a given project. An example of a project splashpage 900 is provided in relation to FIG. 9, which a user may be routed to after login. In this splashpage the user is identified/greeted. Only projects the user is authorized to access are provided on the left hand side of this example splashpage. Permissions for sharing projects is also enabled from this screen, as well as the creation or deletion of projects. For the purposes of this discussion a "project" requires permissions to access either view only or editing permission). Data and reports are project agnostic, and therefore may be accessed without attendant permissions.

Figure 5:
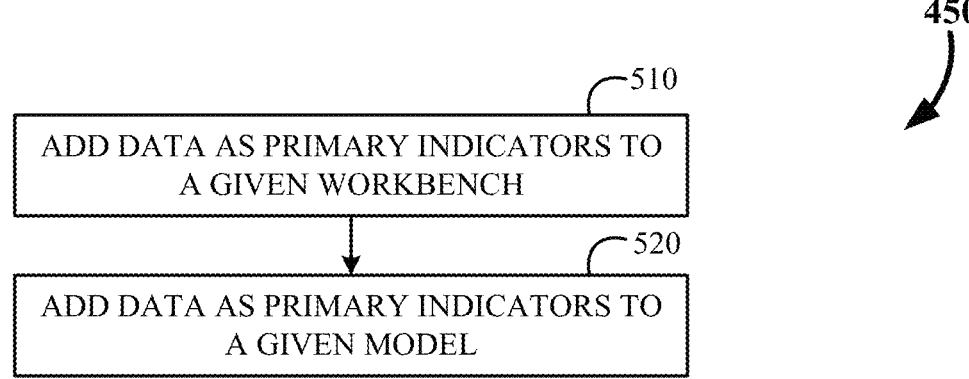
FIG. 5 is a flow chart diagram of manual data management, in accordance with some embodiments.

After the projects dashboards have been accessed the user may decide to manage the data manually or via automated indicator scoring (at 440). FIG. 5 provides a flow diagram of manual data management/selection process 450 in greater detail. Data is added as a primary indicator to a given workbench (at 510), and may additionally be added as a primary indicator to a given model (at 520). Data is determined to be a primary indicator by user. Selection of the primary indicator may employ the user searching for a specific dataset using a keyword search and/or using pre-defined metadata tags. The matching datasets are presented to the user for selection. The search results are ordered by best match to the keyword and/or tags as well as by alternate metrics, such as popularity of a given indicator (used in many other forecast models), quality of indicator data, or frequency of indicator data being updated. Search results may further be sorted and filtered by certain characteristics of the data series, for instance, by region, industry, category, attribute, or the like. In some cases, search display may depend upon a weighted algorithm of any combination of the above factors. In addition to utilizing all or some of the above factors for displaying search results, some embodiments of the method may generate suggestions for indicators to the user independent of the search feature. Likewise, when a user selects an indicator, the system may be able to provide alternate recommendations of 'better' indicators based on any of the above factors.

Figure 6:
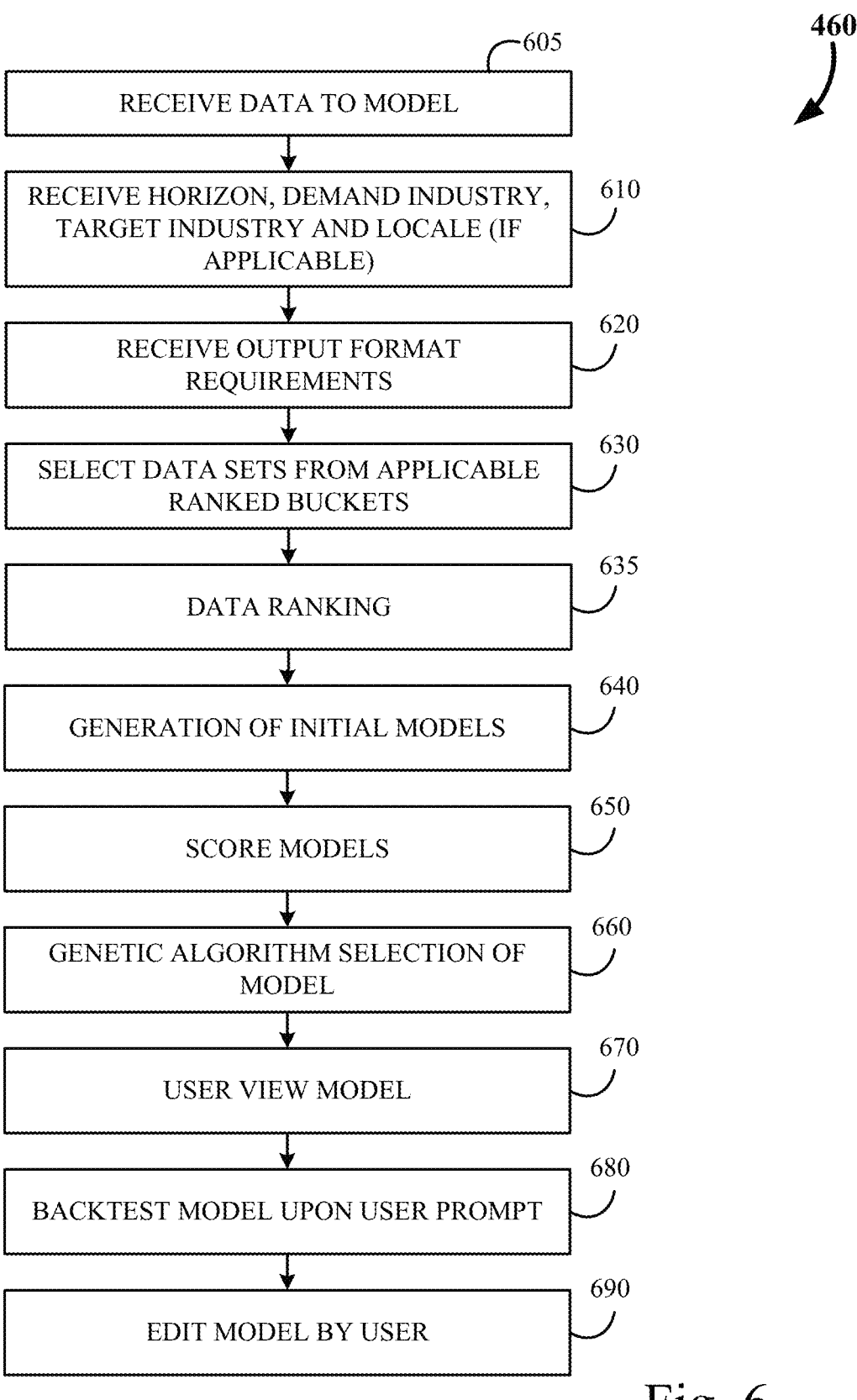
FIG. 6 is a flow chart diagram of automated model management, in accordance with some embodiments.
Figure 7:
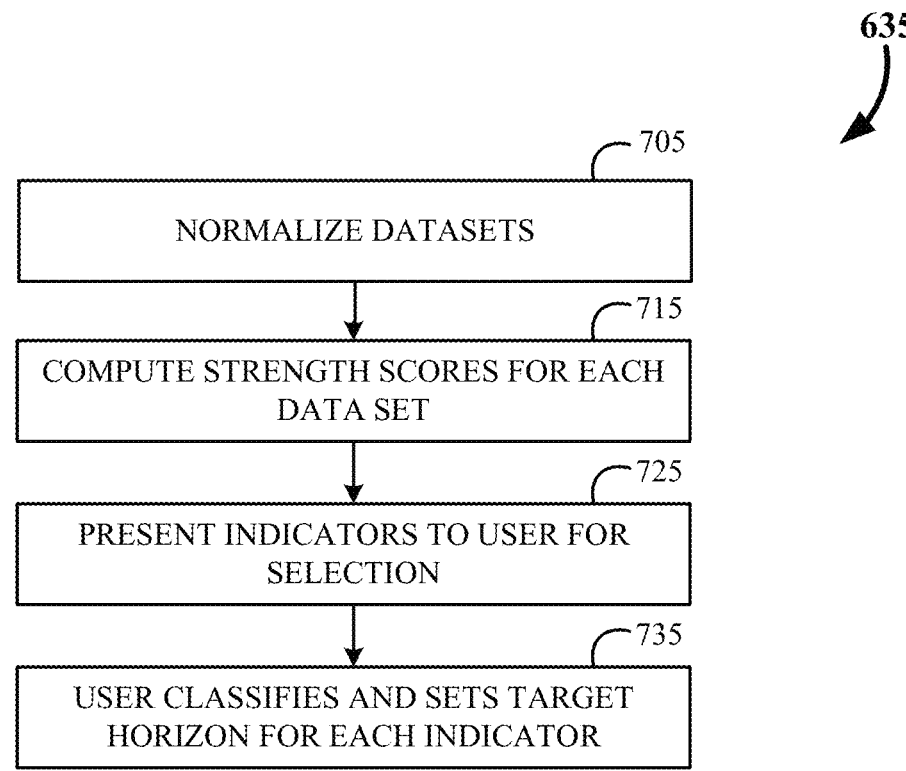
FIG. 7 is a flow chart diagram of automated data ranking, in accordance with some embodiments.

After data has been manually managed (or if only automatic management is desired) the models may be managed (at 460) using the data that has been identified and organized. FIG. 6 provides greater detail into this model management process. Initially, data is received for the model (at 605). The model target horizon (length of model), demand industry, target industry and locale are all received (at 610), which correspond to the bucketized datasets already identified. The output format requirements are also received (at 620). The datasets from the applicable buckets (already identified in the prior process) are selected (at 630), and the data may be automatically ranked (at 635). FIG. 7 provides greater detail of this automated process for ranking indicators for automated selection. In this process, the datasets are normalized (at 705). This may include transforming all the datasets into a percent change over a given time period, an absolute dollar amount over a defined time period, or the like. Likewise, periods of time may also be normalized, such that the analysis window for all factors is equal.

The next step for the automated score generation is the computation of a strength score (at 715) as discussed previously in considerable detail. As noted before, strength scores are dependent upon R-squared, procyclic calculation and a number of additional factors such as numbers of outliers, numbers of models, frequency of updates, etc. These factors are used to calculate metrics (e.g., seasonality factor, frequency of use factor, etc.) which are then multiplied together to generate a final score.

The various indicators are then presented to the user for selection (at 725). Generally this results in between 20-40 indicators being selected by the user which are believed to be "good" candidates for the final model. The user also selects a target horizon for the indicators, and determines the classification for each indicator (at 735). The process helps to ensure that the model has an appropriate number of indicators and an even mix of statistically significant economic, industry-specific and geography-specific indicators.

Returning to FIG. 6, the indicators selected and characterized in step 635 become the input to the parallel modeling (at 640). At this point in the process, the initial indicators that are used come up with an initial population of models to be scored (at 650). Model scoring is described in greater detail in relation to FIG. 8. Initially the model metrics are selected (at 810), and weights are applied to the various selected metrics (at 820). In some embodiments, between 8 and 14 metrics may be selected for model scoring. In some specific embodiment, between 10 and 12 metrics are utilized. In some embodiments, these metrics may include measurements for model fit, model error, variable diversity, overfit prevention, various performance expectations, autocorrelations, residual trends, a series of penalty functions, and target horizon penalties. In some particular embodiments, for example, model fit may be measured as a predictive $R^2$, and model error may be calculated as a MAPE (Mean Absolute Percentage Error) value. In alternate embodiments, model fit is calculated as a combination of predictive R-squared and model trend. Penalty functions may include percentage values that are the wrong sign or have p-values above a threshold. In some embodiments, penalty values may vary based upon p-values and VIF metrics, and are not reliant upon a threshold (no longer considered "binary" in nature). Auto correlation may be calculated by a Durbin Watson test. Additional metrics may be derived from any combination of the above model metrics, or other model metrics not listed.

The weights applied to the metrics generally vary by metric type. For example, for most recursion metrics the weights may be set to a value between 0.01 and 0.3. For example, model fit measures may be assigned a weight set between 0.15 and 0.25, while Auto-correlation metrics may be assigned a value between 0.05 and 0.15. Penalty metrics may be provided a negative weight. For example, generally these metrics are assigned a weight of −0.5 to −4. In some embodiments, a wrong sign metric, for example may be assigned a weight set between −2.5 to −3.5. Of course, p-value and VIF may be more nuanced, and may receive a penalty that is linearly correlated to the p-value or VIF.

After weights have been assigned, the various selected metrics are mapped to model attributes which are being measured. These model attributes may include categories such as forecasting ability, accuracy of the insight, client requirements, model overfit protection, model longevity and model stability, for example. In some embodiments, the weights applied to the individual metrics may be applied to the model attribute(s) which the metric is mapped to, and then summed for all metrics that apply to the attribute. For example, model fit may apply to forecast ability, and model longevity (in addition to other attributes). Model error, in contrast, may map only to forecast ability. Assume for a moment that only these two indicators are used in calculating the score. If model fit were assigned a weight of 0.3 and model error were assigned a weight of 0.15 (for example), then the total weight of forecasting ability would be 0.45, while the total weight of model longevity would only be 0.3, in this particular example.

In some embodiments, it may be desired to have the forecasting ability weight sum be set between 0.5 and 0.75. Likewise, the client requirements attribute may be set between 0.05 and 0.25, the model overfit prevention may be set between 0.25 and 0.5, and the model longevity and model stability weight sums may be set between 0.35 and 0.70. In some embodiments, based upon metric mapping the weights of the various metrics may be optimized to ensure the total weight sums of the model attributes are within the required ranges.

After mapping, and metric weight determination, the initial regression (primary regression) may be applied to a first set of the metrics (at 840). These may include a single regression model created with the full input dataset using all of the variables in the model. For example, the model fit, as determined as a predictive R-square indicates how well a regression model predicts responses for new observations. The predictive R2 is calculated by systematically removing each observation from the data set, estimating the regression equation, and determining how well the model predicts the removed observation. This may be calculated by the following, for example:

$$predictive\ R-squared = \left[1 - \left(PRESS/\text{sums of squares total}\right)\right] * 100;$$

$$where\ PRESS-\text{Predicted Residuals Error Sum of Squares}$$

Like adjusted R-squared, predicted R-squared can be negative and it is lower than R-squared. Because it is impossible to predict random noise, the predicted R-squared will drop for an overfit model. Thus, if a predicted R-squared is much lower than the regular R-squared, the model likely has too many terms. This predicted R-squared is then multiplied by its respective weight to yield the component associated with model fit metric.

Similarly, the MAPE is calculated for the model as a measure of prediction accuracy of a forecasting method in statistics. Its accuracy is expressed as a percentage, and is defined by the formula:

$$\left(\frac{1}{n}\sum\frac{|Actual - Forecast|}{|Actual|}\right)*100$$

Unlike the model fit component, the MAPE calculation is a percentage, and this is divided by 100. The result is subtracted from 1, and this is then multiplied by the model accuracy weight.

Similar calculations are made for variable diversity, The purpose of the Diversity of Variables metric is to show preference for models that include a broader range of variable classifications. A model that has a wider variety of predictor types provides model stability in the event one of the relationships with a predictor breaks down. Diversity of variables is calculated by counting the number of unique classifications represented by the model variables and dividing it by the total number of unique classifications available. Diversity of variables is a percentage-based number that is multiplied by the weight to generate the model score component.

Auto correlation is calculated using a Durbin Watson statistic, which is used to detect the presence of autocorrelation in the residuals (prediction errors) from a regression analysis. Autocorrelation is the similarity of a time series over successive time intervals. It can lead to underestimates of the standard error and can cause you to think predictors are significant when they are not. FIG. 12 provides an example illustration of a Durbin Watson chart, at 1200. Generally Durbin Watson values between 1.5 and 2.5 can be considered relatively normal. As such, to calculate the model score component for auto-correlation, the Durbin Watson value has 2 subtracted from it, and the absolute vale is taken of the result. This is then subtracted from 2, the result divided by 2, and multiplied by the weight. Similar metrics may be measured for residual trends, which are likewise multiplied by the weight to generate a model score component.

After the primary regressions have been calculated for the first metrics to generate a first set of model score components, the penalty metrics may be calculated and applied (at 850). In some cases, penalties are viewed as "binary" metrics that may disqualify a given model from having a high score. These tend to include factors such as a high p-value (above a threshold), or a correlation with a wrong sign. The percentage of the variables that fall into these "unacceptable" categories is then subtracted by 1, and multiplied by the penalty weight. As these weights tend to be relatively large, the presence of these penalties may significantly impact the overall model score. In other embodiments however, p-values and VIF metrics are more accurately refined, and are not 'binary' in nature. In these cases, the penalty value may correlate, in a linear fashion, with the p-values and VIF metrics.

After penalties are calculated, the method applies a secondary holdout sample regression (at 860) to add to the component score. This is a loop of multiple regression models created with sample of the full input dataset using all of the variables in the model. Over-fitting a model is traditionally defined as building a model that memorizes the data but fails to predict well in the future. With the huge number of indicators available for use in models, these exists a high risk of over-fitting a model as it is possible to find all kinds of correlations that are ultimately meaningless. With a large set of explanatory variables, that actually have no relation to the dependent variable being predicted, some variables will in general be spuriously found to be statistically significant and the model builder may retain them in the model, thereby overfitting the model. The essence of overfitting is to have unknowingly extracted some of the residual variation (e.g., the noise) as if that variation represented underlying model structure. Cross-validation (holdout samples) are one of the ways to deal with this.

The holdout loop is a series of iterations that continues until a stable average holdout MAPE value is measured (above a minimum iteration threshold). These iterations include pulling a random sample from the model dataset, generating a regression model for the sample, predicting the holdout sample values using the model, calculating the MAPE, and averaging the MAPE values across all iterations. When the incident MAPE value is comparable to the average, then the MAPE is considered stable and the iterations may be discontinued. This final average MAPE value is defined as a holdout MAPE value, and may be multiplied by the holdout MAPE weight.

Finally, the consistency regression may be applied (at 870). This is a loop of regression models created with a sample of the full input dataset using all of the variables in the model. It differs from the holdout loop in that its goal is to simulate going back in time, building a model, scoring it, and then moving forward in time and repeating the process. This may be performed with the oldest two years of data available, and can be used to build a model to a target horizon. The model predictions are then compared against historical actual data. This process may be repeated for other periods of historical data, and once all data has been processed in this manner the average single period error and average aggregate error can be calculated.

In addition to using historical error information (backwards looking accuracy measure) the system may employ regression models that consume forecast model metrics in order to predict the forecast model error (forwards looking accuracy measure). This regression model has consumed over sixteen million simulations in order to quantify the impact metrics such as coefficient p-values and variance inflation factors (VIF) have on model performance.

The error for a single period shows how consistently accurate the model is for the given period (again by comparing the model predictions versus the actual historical data). Average aggregate error is the accuracy over a cumulative period, then averaged over the entire regression period. Each of these metrics are multiplied by their respective weights in determining consistency of the model.

Once all model score components are thus calculated, they may be aggregated together into a final model score (at 880). This is done through a simple summation of the individual component calculations, or may include an average of the component calculations. Often the model score is normalized to zero to one signal. The distributions within the score are "stretched" between this normalized range in order to leverage the full 'signal' bandwidth. In some embodiments, normalization trims predictive R-square to 0.2 (thereby removing very badly scored models from consideration) and stretch the remaining distribution to better separate the model scores.

Figure 9:
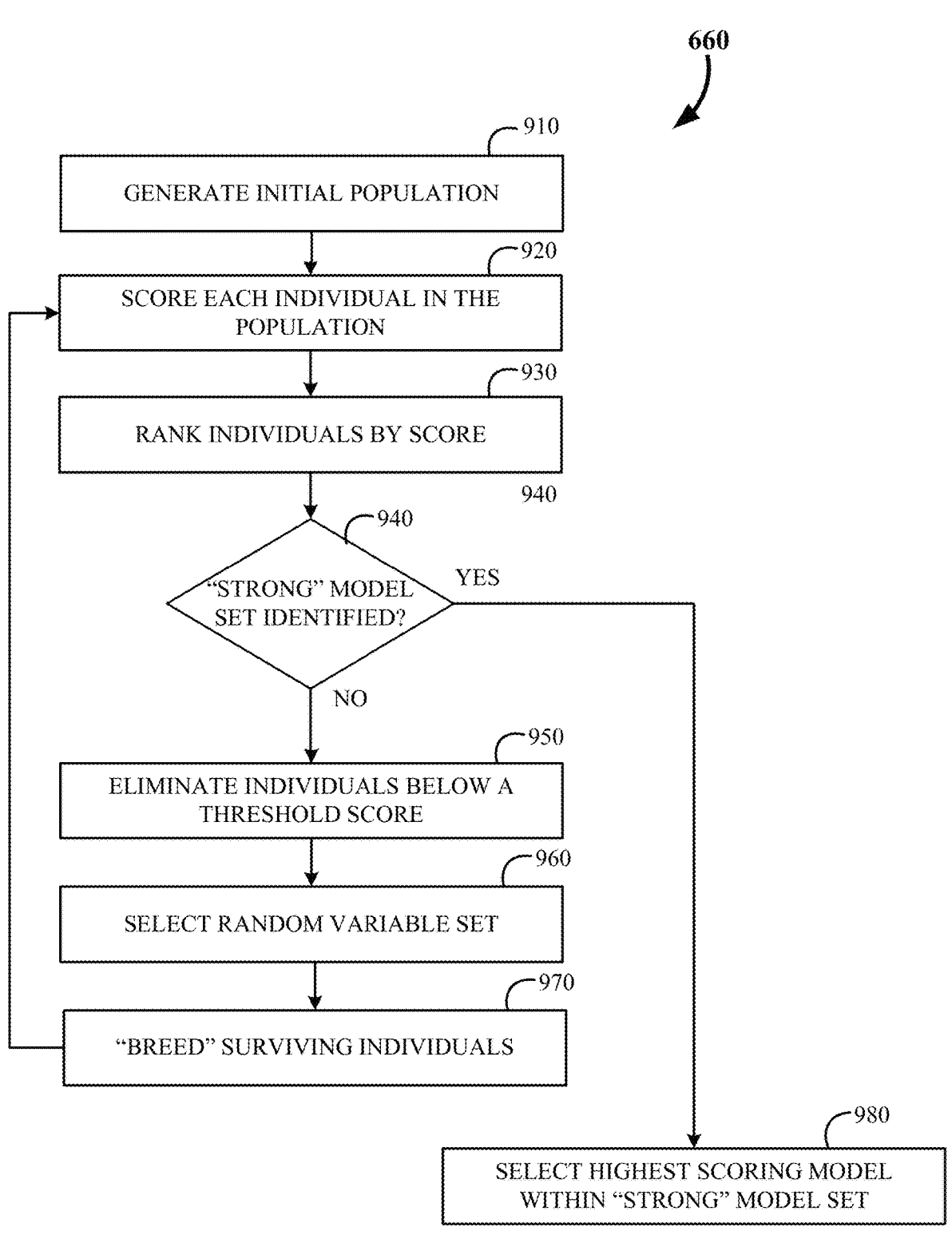
FIG. 9 is a flow chart diagram of model selection via genetic algorithm, in accordance with some embodiments.

Returning now to FIG. 6, model scoring may be employed by the system to select a "best" model (at 660) using what is referred to as a 'genetic algorithm'. FIG. 9 provides a more detailed view of the process employed for the model selection. An initial population of "individuals" are first generated. An individual is defined as a group of variables that are used as predictors of a model, represented by a binary string. For example, if there are 10 candidate predictors X1, X2, . . . . X10, then individual {X1, X2, X3} is represented by 1110000000; and individual {X8, X9, X10} will be represented by 0000000111. A "population" is then the total listing of individuals in a given iteration of the process. After this initial population has been generated, the individuals are each scored (at 920) in the manner described previously. This results in a set of individuals that may be ranked (at 930) by their scores. Unless the population is considered a "strong" set of individuals (at 940), the process iterates by eliminating some portion of the lowest ranked individuals in the population (at 950). This may include eliminating a set number of individuals (e.g., the lowest half of the population), or individuals with scores below a required threshold.

Figure 13:
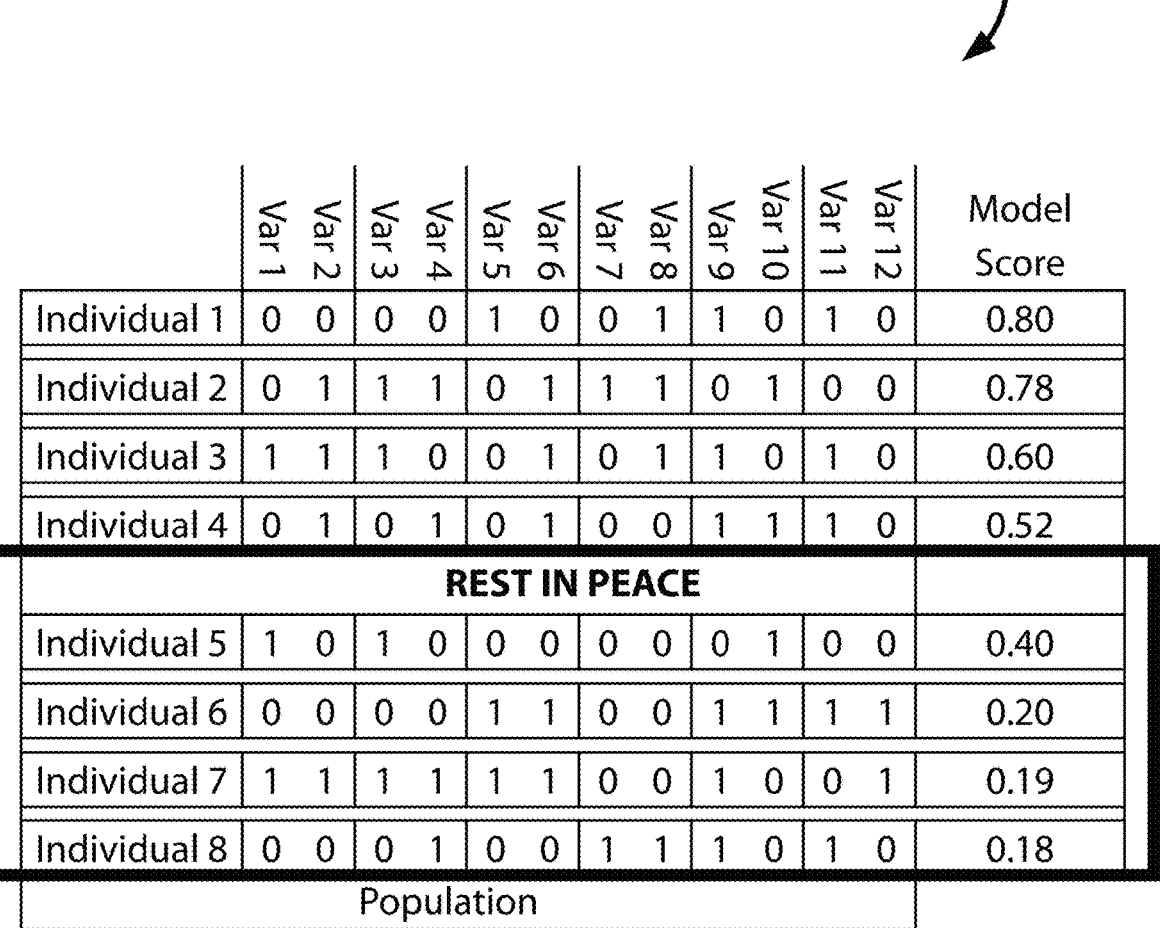
FIGS. 13-15 are example illustrations of a model selection matrix used in the genetic algorithm, in accordance with some embodiments.

This process may be illustrated as a matrix for clarity. FIG. 13, for example, illustrates a set of eight individuals with 12 variables in a matrix (at 1300). These individuals have been scored and ranked. Here the bottom half of the individuals are selected for elimination.

Returning to FIG. 9, a set of variables are randomly selected for the remaining population (at 960). These variables are then swapped from the other remaining models in order to "breed" additional individuals (at 970). Additionally, randomized variables may be altered as "mutations" to the set of individuals. This may result in replacement of all the individuals that were eliminated in step 950. The process may then be repeated with the new population being scored.

Figures 14, 15:
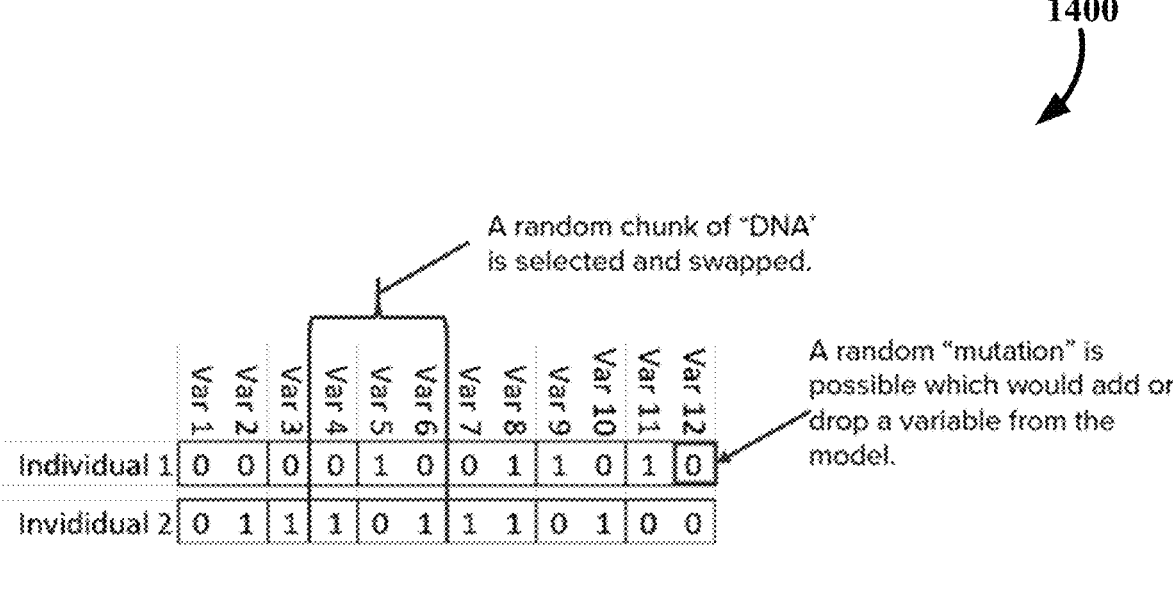

FIG. 14 illustrates this randomized variable selection, at 1400. Here variables 4-6 are selected for swapping between the individuals 1 and 2 in order to generate two new individuals. Additionally, variable 12 of individual 1 is selected for "mutation". FIG. 15 illustrates these newly generated individuals, at 1500.

Returning to FIG. 9, as noted, the process of eliminating and 'breeding' new individuals repeats over multiple iterations until a "strong" set of individuals is identified (at 940). This may be determined once the variation between all model/individual scores in the population are within a set percentage of one another, or within a threshold level of one another. Alternatively, the "strong" set of individuals may be determined when from one iteration to the next, the scores of the population do not vary more than a set threshold.

From this strong model set/population, the highest scoring model is then selected (at 980). It should be noted that while a model may show up several times throughout the process (and as the process converges, there will be many duplicates) each unique model is only scored once. This is accomplished through a shared database of model scores that is added to with every generation. Without this feature, every model would be rescored, and the process cycle time would extend to an unacceptable level. Additionally, variables with very high p-values may be removed from consideration early in the process to speed up convergence.

Figure 10:
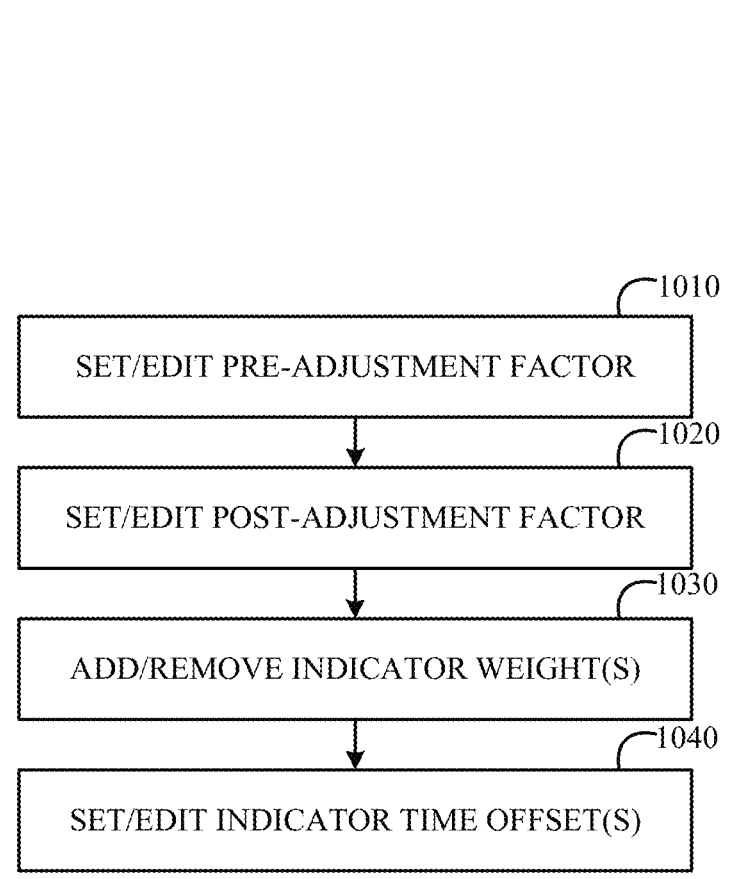
FIG. 10 is a flow chart diagram of user directed model editing, in accordance with some embodiments.

Returning now to FIG. 6, once the model has been thus selected it may be used for viewing (670) and additional analytics such as backtesting (at 680) and editing (at 690). Editing, as seen in greater detail in relation to FIG. 10, may include editing pre-adjustment factors (at 1010), post adjustment factors (at 1020) indicator weights (at 1030) and/or indicator time offsets (at 1040). Pre-adjustment factors and post-adjustment factors are multipliers to the forecast and/or indicators that account for some anomaly in the data. For example, a major snowstorm impacting the eastern seaboard may have an exaggerated impact upon heating costs in the region. If the forecast is for global demand for heating oil, this unusual event may skew the final forecast. An adjustment factor may be leveraged in order to correct for such events. The weight may be any positive or negative number, and is a multiplier against the indicator to vary the influence of the indicator in the final model. A negative weight will reverse procyclic and countercyclic indicators. Determining whether an indicator relationship exists between two data series, as well as the nature and characteristics of such a relationship, if found, can be a very valuable tool. Armed with the knowledge, for example, that certain macroeconomic metrics are predictors of future internal metrics, business leaders can adjust internal processes and goals to increase productivity, profitability, and predictability. The time offset allows the user to move the time domain of any indicator relevant to the forecast. For example, in the above example of global heating oil, the global temperature may have a thirty day lag in reflecting in heating oil prices. In contrast, refining capacity versus crude supply may be a leading indicator of the heating oil prices. These two example indicators would be given different time offsets in order to refine the forecast.

For any forecast indicator, an $R^2$ value, procyclic value and countercyclic value is generated in real time for any given weight and time offset. These statistical measures enable the user to tailor their model according to their concerns. In some embodiments the weights and offsets for the indicators may be auto-populated by the method with suggested values.

Modeling formulas may be configured using machine learning, or expert input. These models may be leveraged by a typical user without any additional interaction. However for a more advanced user, it may be desirable to allow editing of model formulas. In some embodiments, the formula is freeform, allowing the user to tailor the formula however desired. In alternate embodiments, the formula configuration includes a set of discrete transformations, including providing each indicator with a weight, and allowing the indicators to be added/subtracted and/or multiplied or divided against any other single or group of indicators.

Returning to FIG. 4, after model management, reports may be generated (at 470) using the selected model and the model may be published (at 480). Report generation includes compiling desired model metrics together. Report generation may additionally include analysis of the model. For example, FIG. 11 provides a more detailed flowchart for the process of analyzing a model forecast. Initially the primary indicator is charted overlying each explanatory indicator (at 1110). This charting allows a user to rapidly ascertain, using visual cues, the relationship between the primary indicator and each given metric. Humans are very visual, and being able to graphically identify trends is often much easier than using numerical data sets. In addition to the graphs, the R2, procyclic values, and countercyclic values may be presented (at 1120) alongside the charted indicators.

Where the current method is particularly potent is its ability to rapidly shift the time domains, on the fly, of any of the indicators to determine the impact this has on the forecast. In some embodiments, one or more time domain adjusters may be utilized to alter the time domain of indicators, and alter and redefine the time domain in which the selected metrics for a report are displayed. Additionally, the time domain of any given indicator may be locked (at 1130) such that if an indicator is locked (at 1140) any changes to the time domain will only shift for non-locked indicators. Upon a shift in the time domain, the charts that are locked are kept static (at 1150) as the other graphs are updated.

In addition to presenting the graphs comparing indicators to the forecast, in some embodiments, the forecast may be displayed versus actual values (for the past time period), trends for the forecast are likewise displayed, as well as the future forecast values (at 1160). Forecast horizon, mean absolute percent error, and additional statistical accuracy measures for the forecast may also be provided (at 1170). Lastly, the eventual purpose of the generation of the forecast is to modify user or organization behaviors (at 1180).

In some embodiments, modifying behaviors may be dependent upon the user to formulate and implement. In advanced embodiments, suggested behaviors based upon the outlook scores (such as commodity hedging, investment trends, or securing longer or shorter term contracts) may be automatically suggested to the user for implementation. In these embodiments, the system utilizes rules regarding the user, or organization, related to objectives or business goals. These rules/objectives are cross referenced against the outlook scores, and advanced machine learning algorithms may be employed in order to generate the resulting behavior modification suggestions. In some other embodiments, the user may configure state machines in order to leverage outlook scores to generate these behavior modification suggestions. Lastly, in even further advanced embodiments, in addition to the generation of these suggestions, the system may be further capable of acting upon the suggestions autonomously. In some of these embodiments, the user may configure a set of rules under which the system is capable of autonomous activity. For example, the outlook score may be required to have above a specific accuracy threshold, and the action may be limited to a specific dollar amount for example.

Ultimately, the result of the above disclosed process is the generation and selection of reliably accurate models. An example of this, using real world data, is provided in the following FIGS. 16-18. For example, FIG. 16 illustrates a chart between model scores and MAPE values (including predicted MAPE), shown generally at 1600. As can be seen, there is a strong relationship where as the model score increases, the MAPE values decrease. This means that, empirically, models with larger scores have lower error levels.

Likewise, FIG. 17 provides a measure of model overfit against model score, at 1700. As model scores increase, empirically, model overfit (as measured by the R-square minus the Predicted R-square, as discussed before) decreases.

Finally, turning to FIG. 18, the standard error of coefficients are shown as compared to the model score, at 1800. Again, empirically these is a strong correlation between model score increase and a decrease of the standard error of model coefficients.

Each of these empirical charts prove that the scoring of models, as disclosed herein, is an accurate, automated, and repeatable method of determining which models are better performing in the moment, and over time.

Figure 19:
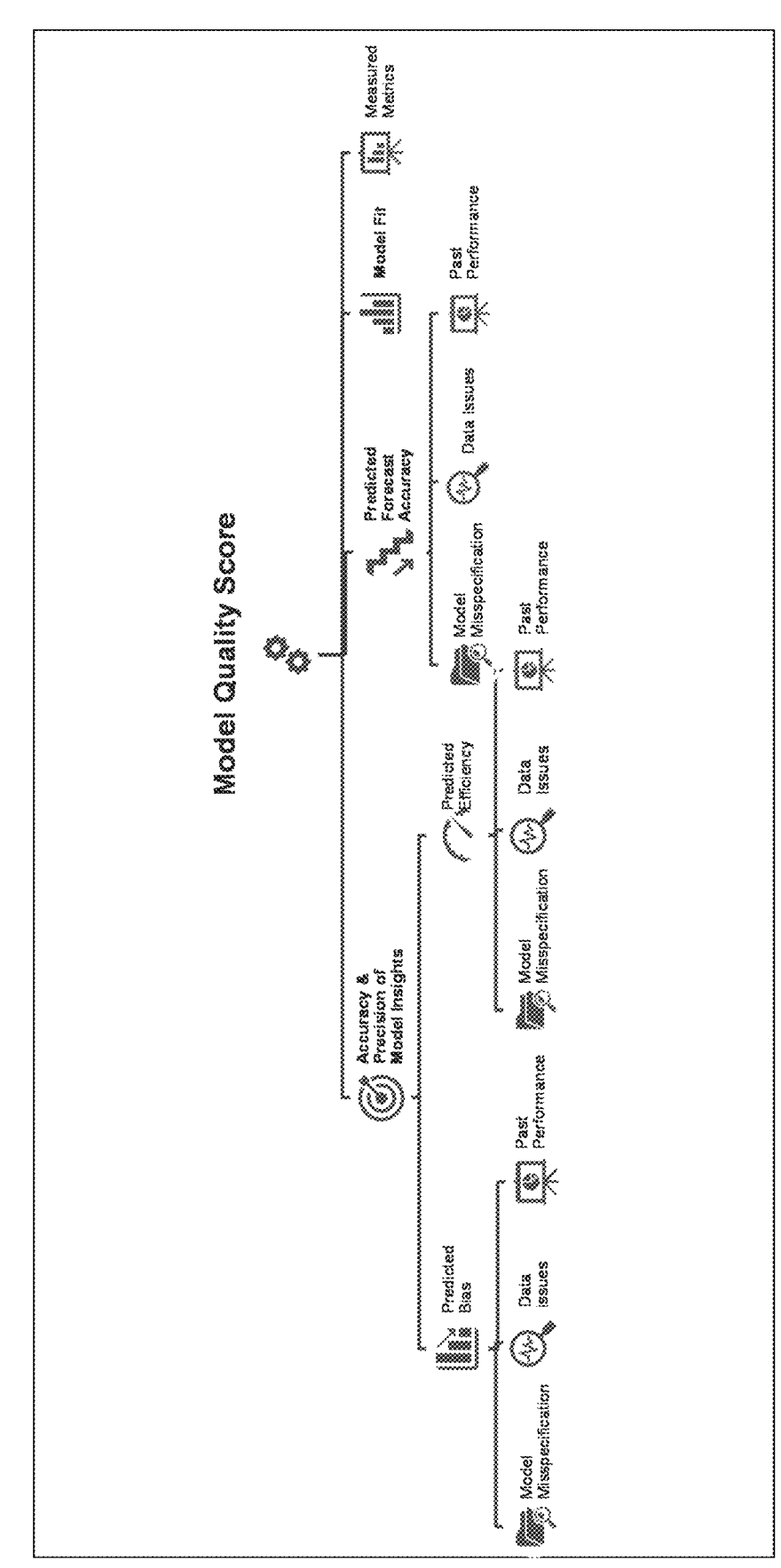
FIG. 19 is an example illustration of the model scoring function, in accordance with some embodiments.

Lastly, turning to FIG. 19, an overview of the model scoring is provided in an illustrative format 1900. The model quality scoring function is comprised of two main attributes that together account for model accuracy, stability and forecasting accuracy. Each attribute ties to a model outcome and is modeled separately. In addition, each attribute has a measured and predicted component, as discussed above. The measured component is derived by backwards looking at model performance versus historical error data. The forward looking predictive component leverages a regression model that consumes the metrics of the forecast model to predict its accuracy. Residual trends, MAPE, and predictive R-squared were found to be especially critical, and are retained from the previous model score in their previous form. Together these three metrics represent a separate attribute that is called the 'model fit'.

Model accuracy and prediction of insights is a collation of predicted bias and predicted efficiency. This is combined with the predicted forecast accuracy, the model fit, and measured model metrics to arrive at the final model score.

III. System Embodiments

Figure 20A:
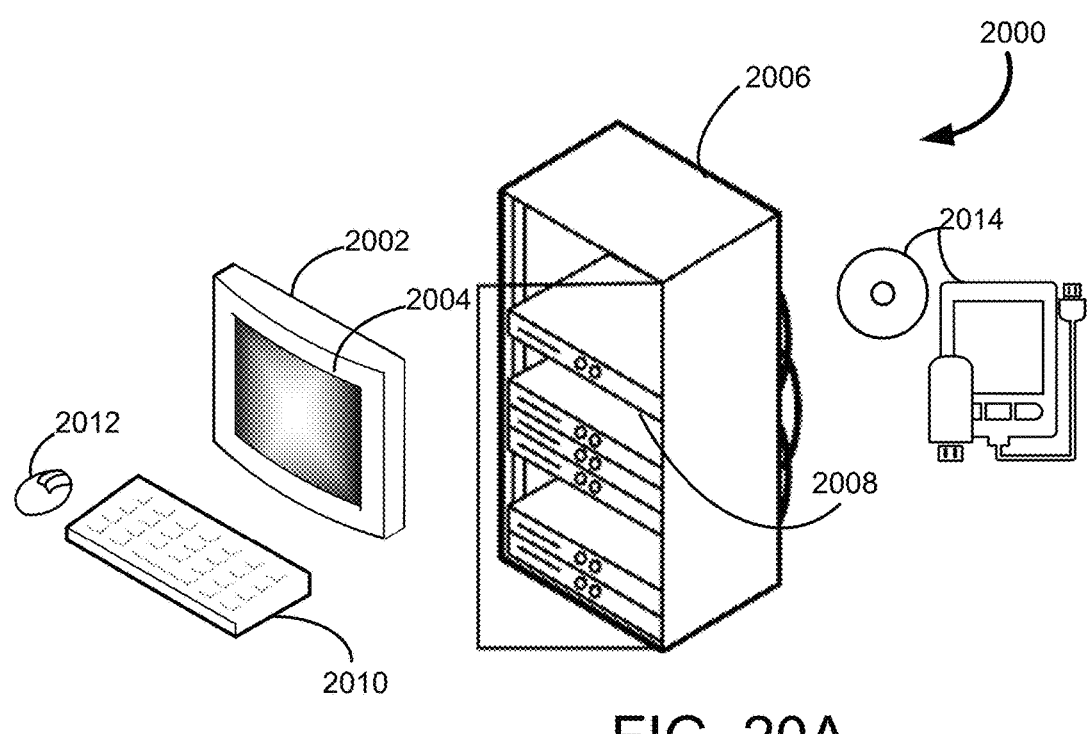
FIGS. 20A and 20B illustrate exemplary computer systems capable of implementing embodiments of the data management and forecasting system.
Figure 20B:
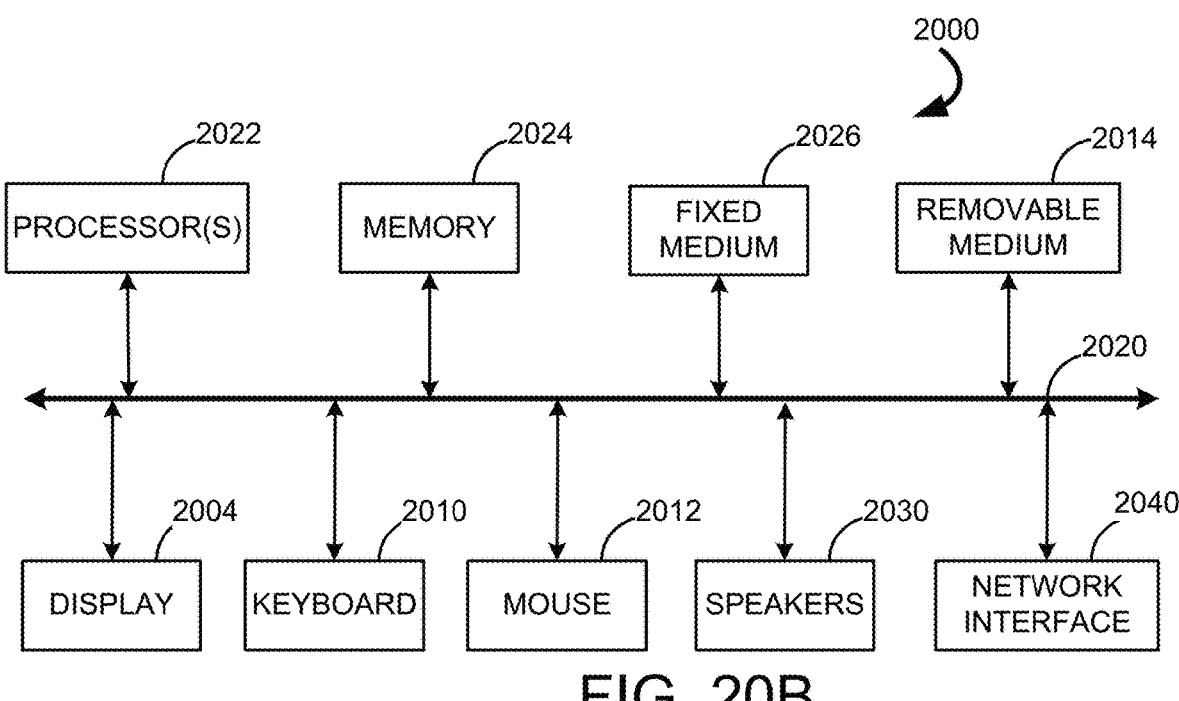

Now that the systems and methods for the generation, scoring and selection of models and management of these models and data have been described, attention shall now be focused upon systems capable of executing the above functions. To facilitate this discussion, FIGS. 20A and 20B illustrate a Computer System 2000, which is suitable for implementing embodiments of the present invention. FIG.

20A shows one possible physical form of the Computer System 2000. Of course, the Computer System 2000 may have many physical forms ranging from a printed circuit board, an integrated circuit, and a small handheld device up to a huge super computer. Computer system 2000 may include a Monitor/terminal 2002, a Display 2004, a Housing 2006, one or more storage devices and server blades 2008, a Keyboard 2010, and a Mouse 2012. Disk 2014 is a computer-readable medium used to transfer data to and from Computer System 2000.

FIG. 20B is an example of a block diagram for Computer System 2000. Attached to System Bus 2020 are a wide variety of subsystems. Processor(s) 2022 (also referred to as central processing units, or CPUs) are coupled to storage devices, including Memory 2024. Memory 2024 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed medium 2026 may also be coupled bi-directionally to the Processor 2022; it provides additional data storage capacity and may also include any of the computer-readable media described below. Fixed medium 2026 may be used to store programs, data, and the like and is typically a secondary storage medium (such as a hard disk) that is slower than primary storage. It will be appreciated that the information retained within Fixed medium 2026 may, in appropriate cases, be incorporated in standard fashion as virtual memory in Memory 2024. Removable Disk 2014 may take the form of any of the computer-readable media described below.

Processor 2022 is also coupled to a variety of input/output devices, such as Display 2004, Keyboard 2010, Mouse 2012 and Speakers 2030. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 2022 optionally may be coupled to another computer or telecommunications network using Network Interface 2040. With such a Network Interface 2040, it is contemplated that the Processor 2022 might receive information from the network, or might output information to the network in the course of performing the above-described generation, scoring and selection of models. Furthermore, method embodiments of the present invention may execute solely upon Processor 2022 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 2000 can be controlled by operating system software that includes a file manage- ment system, such as a disk operating system. One example of operating system software with associated file manage- ment system software is the family of operating systems known as Windows® from Microsoft Corporation of Red- mond, Washington, and their associated file management systems. Another example of operating system software with its associated file management system software is the Linux operating system and its associated file management system. The file management system is typically stored in the non-volatile memory and/or drive unit and causes the processor to execute the various acts required by the oper- ating system to input and output data and to store data in the memory, including storing files on the non-volatile memory and/or drive unit.

Some portions of the detailed description may be pre- sented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requir- ing physical manipulations of physical quantities. Usually, though not necessarily, these quantities take the form of electrical or magnetic signals capable of being stored, trans- ferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other appa- ratus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be imple- mented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a central- ized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typi- cally comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer sys- tems, those skilled in the art will appreciate that the various embodiments are capable of being distributed as a program product in a variety of forms, and that the disclosure applies equally regardless of the particular type of machine or computer-readable media used to actually effect the distri- bution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computerized method for selecting a model, useful in association with a business analytics system, the method comprising:

receiving, at a computer system, an initial set of models, wherein the models comprise a series of variables representable as a binary string;

scoring, in the computer system, each of the initial set of models, wherein the scoring includes predicting model error using an iterative regression model of millions of forecast simulations;

ranking, in the computer system, the initial set of models by their scores;

removing, in the computer system, a subset of the initial set of models with a ranking below a threshold to yield a remaining set of models;

randomly selecting, in the computer system, a subset of the variables;

exchanging, in the computer system, the binary strings associated with the randomly selected subset of vari- ables between the remaining set of models to generate a new set of models;

scoring, in the computer system, each of the new set of models;

determining if the new set of models is acceptable;

when the new set of models is not acceptable then ranking the new set of models by their scores, removing a subset of the new set of models with a ranking below a threshold to yield a new remaining set of models, and repeating the prior four steps in the computer system;

when the new set of models is acceptable, selecting, in the computer system, a model from the new set of models with the highest score.

2. The method of claim 1, further comprising selecting a random variable, and at least one of removing or altering the selected random variable when exchanging the binary strings.

3. The method of claim 1, wherein the determining if the new set of models is acceptable includes comparing the scores of the new set of models against scores from prior scoring iteration.

4. The method of claim 3, wherein the determining if the new set of models is acceptable is when the scores of the new set of models have changed less that a threshold as compared against the scores from the prior scoring iteration.

5. The method of claim 1, wherein the determining if the new set of models is acceptable is when the scores of the new set of models are all above a threshold.

6. The method of claim 1, wherein the scoring of the initial set of models and new set of models includes at least a primary regression analysis and a penalty function.

7. The method of claim 1, wherein the subset of models removed are models with a score below a required threshold.

8. The method of claim 1, wherein the subset of models removed are half of the set of models with the lowest ranking.

9. The method of claim 1, further comprising storing the scoring of each model in a shared database such that each model is only scored once.

10. The method of claim 1, further comprising removing variables from the series of variables with a p-value above a threshold.

11. A computerized system for selecting a model comprising:

a model generator for providing an initial set of models, wherein the models comprise a series of variables representable as a binary string;

a model scoring server for scoring each of the initial set of models, wherein the scoring includes predicting model error using an iterative regression model of millions of forecast simulations;

a model quality assessment server for ranking the initial set of models by their scores, removing a subset of the initial set of models with a ranking below a threshold to yield a remaining set of models, randomly selecting a subset of the variables, and exchanging the binary strings associated with the randomly selected subset of variables between the remaining set of models to generate a new set of models;

the model scoring server for scoring each of the new set of models; and the model quality assessment server for determining if the new set of models is acceptable, and when the new set of models is not acceptable then ranking the new set of models by their scores, removing a subset of the new set of models with a ranking below a threshold to yield a new remaining set of models, and in conjunction with the model scoring server, iterating the scoring, ranking, and determining steps, and when the new set of models is acceptable, selecting a model from the new set of models with the highest score.

12. The system of claim 11, wherein the model quality assessment server is further configured for selecting a random variable, and at least one of removing or altering the selected random variable when exchanging the binary strings.

13. The system of claim 11, wherein the determining if the new set of models is acceptable includes comparing the scores of the new set of models against scores from prior scoring iteration.

14. The system of claim 13, wherein the determining if the new set of models is acceptable is when the scores of the new set of models have changed less that a threshold as compared against the scores from the prior scoring iteration.

15. The system of claim 11, wherein the determining if the new set of models is acceptable is when the scores of the new set of models are all above a threshold.

16. The system of claim 11, wherein the scoring of the initial set of models and new set of models includes at least a primary regression analysis and a penalty function.

17. The system of claim 11, wherein the subset of models removed are models with a score below a required threshold.

18. The system of claim 11, wherein the subset of models removed are half of the set of models with the lowest ranking.

19. The system of claim 11, further comprising storing the scoring of each model in a shared database such that each model is only scored once.

20. The system of claim 11, further comprising removing variables from the series of variables with a p-value above a threshold.

* * * * *